United States Patent
Kim et al.

(10) Patent No.: US 11,405,866 B2
(45) Date of Patent: Aug. 2, 2022

(54) METHOD AND APPARATUS FOR SAVING POWER OF USER EQUIPMENT IN WIRELESS COMMUNICATION SYSTEM

(71) Applicant: Samsung Electronics Co., Ltd., Suwon-si (KR)

(72) Inventors: Taeyoung Kim, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/861,921

(22) Filed: Apr. 29, 2020

(65) Prior Publication Data

US 2020/0351777 A1 Nov. 5, 2020

(30) Foreign Application Priority Data

May 2, 2019 (KR) .......... 10-2019-0051866

(51) Int. Cl.
*H04W 52/02* (2009.01)
*H04W 72/04* (2009.01)

(52) U.S. Cl.
CPC ..... *H04W 52/0225* (2013.01); *H04W 72/042* (2013.01)

(58) Field of Classification Search
CPC ............. H04W 52/02; H04W 52/0229; H04W 52/0235; H04W 72/04; H04W 72/042; H04W 76/28
See application file for complete search history.

(56) References Cited

U.S. PATENT DOCUMENTS

| | | | | |
|---|---|---|---|---|
| 2012/0014306 A1* | 1/2012 | Pelletier | ............ | H04W 52/0216 370/311 |
| 2013/0301420 A1* | 11/2013 | Zhang | ............ | H04W 4/90 370/241 |
| 2016/0044541 A1* | 2/2016 | Lunden | ............ | H04W 24/08 370/252 |
| 2017/0325164 A1 | 11/2017 | Lee et al. | | |
| 2018/0332655 A1 | 11/2018 | Ang et al. | | |

(Continued)

FOREIGN PATENT DOCUMENTS

KR 10-2018-0090178 A 8/2018
KR 10-2018-0121350 A 11/2018

(Continued)

OTHER PUBLICATIONS

International Search Report dated Aug. 6, 2020, issued in International application No. PCT/KR2020/005899.

(Continued)

*Primary Examiner* — Jamal Javaid
(74) *Attorney, Agent, or Firm* — Jefferson IP Law, LLP

(57) ABSTRACT

An operating method of a user equipment (UE) to save power of the UE in a wireless communication system is provided. The operating method includes receiving wake up signal (WUS) configuration information from a base station (BS), monitoring a physical downlink control channel (PDCCH) based on the WUS configuration information, and stopping monitoring the PDCCH based on the WUS configuration information and operating in a short discontinuous reception (DRX) cycle, when a certain event occurs in Active time.

20 Claims, 23 Drawing Sheets

(56) References Cited

U.S. PATENT DOCUMENTS

| | | |
|---|---|---|
| 2019/0159280 A1* | 5/2019 | Chakraborty ......... H04W 76/28 |
| 2019/0239189 A1 | 8/2019 | Hwang et al. |
| 2020/0205076 A1 | 6/2020 | Chen et al. |
| 2021/0289409 A1 | 9/2021 | Moon et al. |

FOREIGN PATENT DOCUMENTS

| | | |
|---|---|---|
| WO | 2018/204799 A1 | 11/2018 |
| WO | 2018/210135 A1 | 11/2018 |
| WO | 2019/063479 A1 | 4/2019 |

OTHER PUBLICATIONS

Extended European Search Report dated Apr. 19, 2022, issued in a counterpart European Application No. 20799219.9.
Juho Lahdenpera: "On Feasibility of the UE Power Saving Signal for the 5G New Radio", Master's Thesis, May 1, 2019, XP055845783.

* cited by examiner

METHOD AND APPARATUS FOR SAVING POWER OF USER EQUIPMENT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0051866, filed on May 2, 2019, in the Korean Intellectual Property Office, the disclosure of which is incorporated by reference herein in its entirety.

BACKGROUND

1. Field

The disclosure relates to a method and apparatus for saving power of a user equipment in a wireless communication system.

2. Description of Related Art

To meet the demand for ever-increasing wireless data traffic after commercialization of the 4th generation (4G) communication system, there have been efforts to develop an advanced 5th generation (5G) or pre-5G communication system. For this reason, the 5G or pre-5G communication system is also called a beyond 4G network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range of radio waves in the ultra-frequency bands, beamforming, massive multiple-input multiple-output (massive MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-centered connectivity network where humans generate and consume information into an Internet of Things (IoT) network where distributed entities such as things send, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that create a new value to human life by collecting and analyzing data generated among connected things. IoT may be applied to a variety of areas, such as smart home, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

With the development of the aforementioned technologies and wireless communication systems, it is possible to provide various services, and there is a need for a method to provide the services smoothly. A communication method of saving power of a user equipment in particular is required to provide the services for the user for longer period of time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and apparatus for saving power of a user equipment in a wireless communication system.

Additional aspects will be set forth in part in the description which follows and, in part, will be apparent from the description, or may be learned by practice of the presented embodiments.

In accordance with an aspect of the disclosure, an operating method of a user equipment (UE) to save power of the UE in a wireless communication system is provided. The operating method includes receiving wake up signal (WUS) configuration information from a base station (BS), monitoring a physical downlink control channel (PDCCH) based on the WUS configuration information, and stopping monitoring the PDCCH based on the WUS configuration information and operating in a short discontinuous reception (DRX) cycle, when a certain event occurs in Active time.

The stopping of monitoring the PDCCH based on the WUS configuration information and operating in the short DRX cycle may include waking up and monitoring the PDCCH on a DRX occasion corresponding to a WUS occasion on which the PDCCH is not monitored based on the WUS configuration information.

The certain event may include reception of a PDCCH indicating at least one of uplink (UL) transmission or downlink (DL) transmission.

The stopping of monitoring the PDCCH based on the WUS configuration information and operating in the short DRX cycle may include starting a drx-ShortCycleTimer on expiry of a drx-onDurationTimer or a drx-InactivityTimer, and stopping monitoring the PDCCH based on the WUS configuration information during operation of the drx-ShortCycleTimer.

The operating method may further include resuming monitoring the PDCCH based on the WUS configuration information and operating in a long DRX cycle, when the drx-ShortCycleTimer stops or expires.

The operating method may further include, when a DRX occasion, subsequent to the resuming of monitoring the PDCCH based on the WUS configuration information and operating in the long DRX cycle, corresponds to the WUS occasion on which the PDCCH is not monitored based on the WUS configuration information during operation in the short DRX cycle, waking up on the DRX occasion, and monitoring the PDCCH.

The WUS configuration information may include a WUS offset and a WUS cycle.

The monitoring of the PDCCH may include monitoring or not monitoring the PDCCH when the WUS occasion is located in the Active time, and the operating method may further include performing a particular operation on a DRX occasion related to the WUS occasion according to whether the PDCCH is monitored.

The operating method may further include receiving, from the BS on the PDCCH, a WUS indicating whether the UE is to wake up on a DRX occasion, and waking up on the DRX occasion related to the WUS, based on the WUS.

The operating method may further include, when the reception of the WUS fails, operating according to indication of a previously received WUS, performing a default operation, or skipping a DRX occasion related to the WUS not received.

In accordance with another aspect of the disclosure, a UE in a wireless communication system is provided. The user equipment includes a transceiver, at least one memory storing a program to execute an operation to save power of the UE, and at least one processor configured to execute the program to receive WUS configuration information from a BS, monitor a PDCCH based on the WUS configuration information, and stop monitoring the PDCCH based on the WUS configuration information and operating in a short DRX cycle, when a certain event occurs in Active time.

The at least one processor may be further configured to wake up and monitor the PDCCH on a DRX occasion corresponding to a WUS occasion on which the PDCCH is not monitored based on the WUS configuration information.

The certain event may include reception of a PDCCH indicating at least one of UL transmission or DL transmission.

The at least one processor may be further configured to start a drx-ShortCycleTimer on expiry of a drx-onDurationTimer or a drx-InactivityTimer, and stop monitoring the PDCCH based on the WUS configuration information during operation of the drx-ShortCycleTimer.

The at least one processor may be further configured to resume monitoring the PDCCH based on the WUS configuration information and operate in a long DRX cycle, when the drx-ShortCycleTimer stops or expires.

The at least one processor may be further configured to, when a DRX occasion, subsequent to resuming monitoring the PDCCH based on the WUS configuration information and operating in the long DRX cycle, corresponds to the WUS occasion on which the PDCCH is not monitored based on the WUS configuration information during operation in the short DRX cycle, wake up in the DRX occasion and monitor the PDCCH.

The WUS configuration information may include a WUS offset and a WUS cycle.

The at least one processor may be further configured to monitor or not monitor the PDCCH when the WUS occasion is located in the Active time, and perform a particular operation on a DRX occasion related to the WUS occasion according to whether the PDCCH is monitored.

The at least one processor may be further configured to receive, from the BS on the PDCCH, a WUS indicating whether the UE is to wake up on a DRX occasion, and wake up on the DRX occasion related to the WUS based on the WUS.

The at least one processor may be further configured to, when the reception of the WUS fails, operate according to indication of a previously received WUS, perform a default operation, or skip a DRX occasion related to the WUS not received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
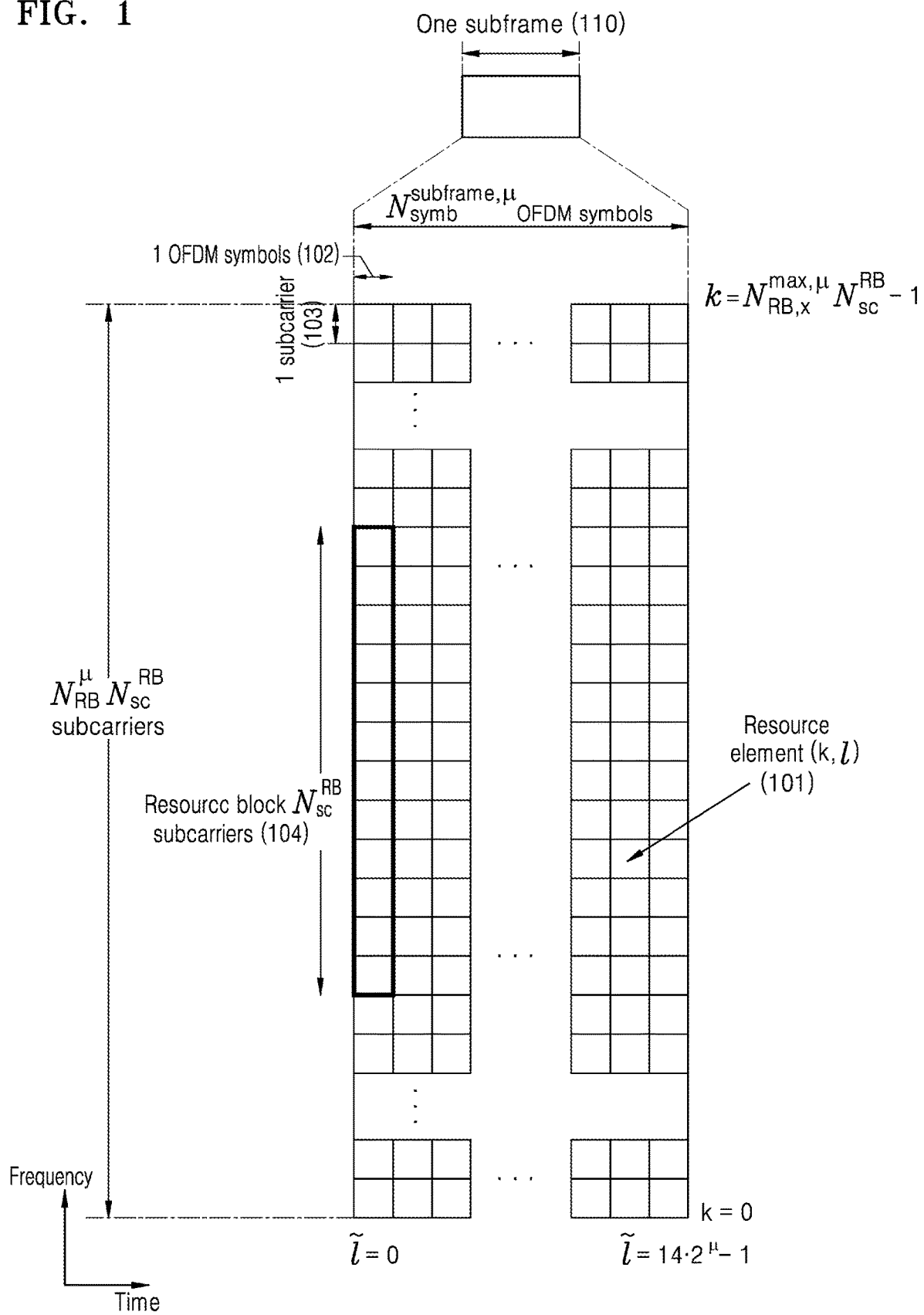
FIG. 1 illustrates a basic structure of the time-frequency domain in a mobile communication system, according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smart phone, a computer, or a multimedia system capable of communication.

In the disclosure, a controller may also be referred to as a processor.

In the disclosure, a layer (or layer apparatus) may also be referred to as an entity.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those of skill in the art. Like numbers refer to like elements throughout the specification. In the description of the disclosure, when it is determined that a detailed description of related functions or configurations may unnecessarily obscure the subject matter of the disclosure, the detailed description will be omitted. Further, terms, as will be mentioned later, are defined by taking functionalities in the disclosure into account, but may vary depending on practices or intentions of users or operators. Accordingly, the terms should be defined based on the descriptions throughout this specification.

Although the following embodiments will focus on long term evolution (LTE), LTE-Advanced (LTE-A), and new radio (NR) systems, they may be applied to other communication systems with similar technical backgrounds or channel types. For example, the NR system may be the 5th generation (5G) mobile communication technology, i.e., 5G NR, developed after the LTE-A, and the term '5G' as herein used may be a concept including the existing LTE, LTE-A, or other similar services. Furthermore, those of ordinary skill in the art will appreciate that embodiments of the disclosure will also be applied to different communication systems, e.g., worldwide interoperability for microwave access (WiMAX) and wireless broadband (WiBro), with some modifications to such an extent that does not significantly deviate from the scope of the disclosure.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a greater number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as third generation partnership project (3GPP) high speed packet access (HSPA), LTE or evolved universal terrestrial radio access (E-UTRA), LTE-A, LTE-Pro, 3GPP2 high rate packet data (HRPD), ultra mobile broadband (UMB), and IEEE 802.16e communication standards.

As a representative example of such a broadband wireless communication system, an LTE system adopts orthogonal frequency division multiplexing (OFDM) for downlink (DL) and single carrier frequency division multiple access (SC-FDMA) for uplink (UL). The UL refers to a radio link for a terminal (i.e., a UE or MS) to transmit data or a control signal to a BS (e.g., evolved Node B (eNB), next generation Node B (gNB), or Node B), and the DL refers to a radio link for a BS to transmit data or a control signal to a terminal. A multiple access scheme allocates and operates time-frequency resources for carrying data or control information for respective users not to overlap each other, i.e., to maintain orthogonality, thereby differentiating each user's data or control information. It is not limited thereto, and in the 5G communication system, a non-orthogonal multiple access (NOMA) scheme and an OFDM scheme for UL are also considered to be used.

As a future communication system after the LTE, the 5G communication system needs to freely reflect various demands from users and service providers and thus support services that simultaneously meet the various demands. The services considered for the 5G communication system may include enhanced mobile broadband (eMBB), massive machine type communication (mMTC), ultra reliability low latency communication (URLLC), etc.

The eMBB is aimed at providing more enhanced data rates than LTE, LTE-A, or LTE-Pro may support. For example, in the 5G communication system, the eMBB is required to provide 20 Gbps peak data rate in DL and 10 Gbps peak data rate in UL in terms of a single BS. Furthermore, the 5G communication system needs to provide increasing user perceived data rate while providing the peak data rate. To satisfy these requirements, enhancement of various technologies for transmission or reception including multiple-input multiple-output (MIMO) transmission technologies is required. While the LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

Furthermore, in the 5G communication system, mMTC is considered to support an application service such as an Internet of Things (IoT) application service. In order for the mMTC to provide the IoT efficiently, support for access from a massive number of terminals in a cell, enhanced coverage of the terminal, extended battery time, reduction in terminal price, etc., are required. Because the IoT is equipped in various sensors and devices to provide communication functions, it may be supposed to support a large number of terminals in a cell (e.g., 1,000,000 terminals/$km^2$). Furthermore, a terminal supporting the mMTC is more likely to be located in a shadow area, such as underground of a building, which might not be covered by a cell by the nature of the service, so the mMTC may require a larger coverage than expected for other services provided by the 5G communication system. A terminal supporting the mMTC needs to be a low-cost terminal, and may require a battery life time such as 10 to 15 years, because the battery in the terminal is difficult to change frequently.

Finally, URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency (ultra low latency) and very high reliability. For example, URLCC services need to satisfy sub-millisecond (less than 0.5 millisecond) air interface latency and simultaneously, require error rates lower than 1 packet lost in $10^5$ packets. Hence, for the URLLC services, the 5G system needs to provide a smaller transmit time interval (TTI) than for other services, and simultaneously requires a design that allocates a wide range of resources for a frequency band to secure reliability of the communication link.

Those three services in 5G (eMBB, URLLC, and mMTC) may be multiplexed in a single system for transmission. In this case, to meet different requirements for the three services, different transmission or reception schemes and parameters may be used between the services. 5G, however, is not limited to the three services.

In the following description, a method of monitoring downlink control information (DCI) corresponding to a power saving signal and a physical downlink control channel (PDCCH) for detecting the DCI corresponding to the power saving signal, and a method, performed by a terminal, of performing power saving based on the detected DCI are provided.

A frame structure of a next generation mobile communication system (5G or NR system) will now be described in detail with reference to accompanying drawings.

FIG. 1 illustrates a basic structure of the time-frequency domain in a next generation mobile communication system, according to an embodiment of the disclosure.

Referring to FIG. 1, the horizontal axis represents the time domain, and the vertical axis represents the frequency domain. A basic resource unit in the time and frequency domain is a resource element (RE) 101. The RE 101 may be defined as an OFDM symbol 102 on the time axis and a subcarrier 103 on the frequency axis. In the frequency domain, $N_{SC}^{RB}$ consecutive REs (e.g., 12 REs as shown in FIG. 1) may constitute a single resource block (RB) 104. In an embodiment of the disclosure, a plurality of OFDM symbols may constitute one subframe 110.

Figure 2:
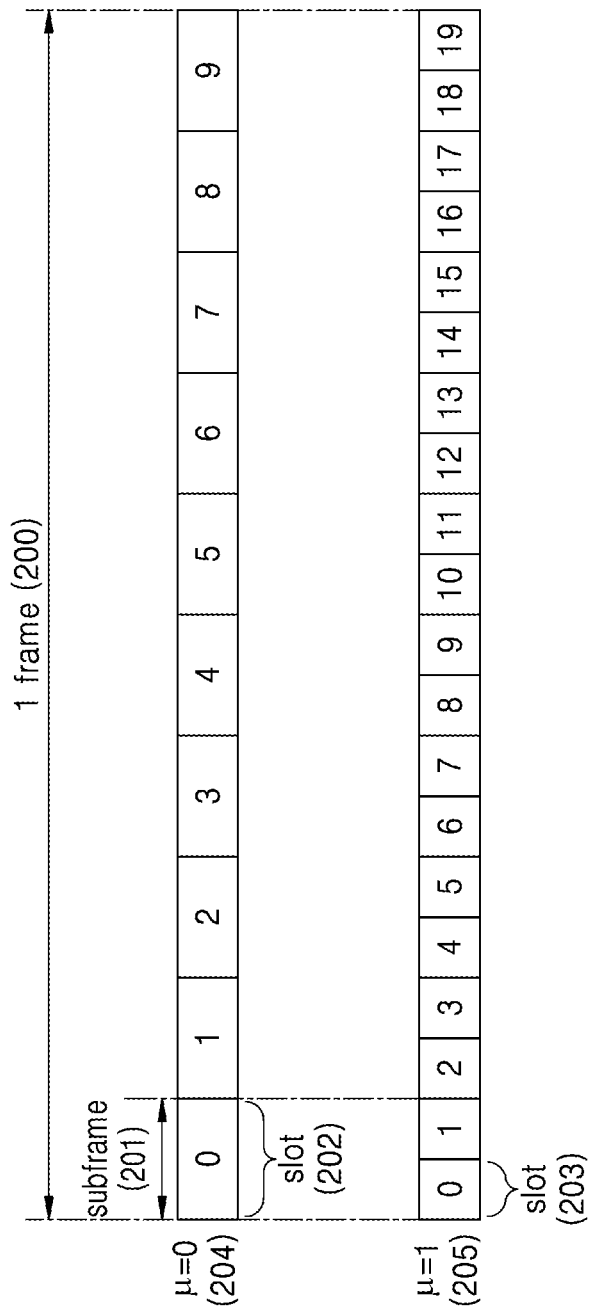
FIG. 2 illustrates a frame, subframe, and slot structure in a mobile communication system, according to an embodiment of the disclosure.

FIG. 2 illustrates a frame, subframe, and slot structure in a next generation mobile communication system, according to an embodiment of the disclosure.

Referring to FIG. 2, an embodiment of the disclosure of a frame 200, subframe 201, and slot 202 structure is shown. The one frame 200 may be defined to have a length of 10 ms. The one subframe 201 may be defined to have a length of 1 ms. That is, the one frame 200 may include a total of 10 subframes 201.

In an embodiment of the disclosure, the one slot 202 or 203 may be defined to have 14 OFDM symbols (i.e., the number of symbols per 1 slot ($N_{symb}^{slot}$)=14). The one subframe 201 may include one or more slots 202 or 203, and the number of slots 202 and 203 per 1 subframe may vary depending on subcarrier spacing configuration values μ (204 and 205). In the example of FIG. 2, the subcarrier spacing configuration values are 0 and 1, i.e., μ=0 (204) and μ=1 (205). In the case of μ=0 (204), the one subframe 201 includes one slot 202, and in the case of μ=1 (205), the one subframe 201 includes two slots 203. That is, depending on the subcarrier spacing configuration value μ, the number of slots per 1 subframe ($N_{slot}^{subframe,\mu}$) may vary and the number of slots per 1 frame ($N_{slot}^{frame,\mu}$) may vary accordingly. $N_{slot}^{subframe,\mu}$ and $N_{slot}^{frame,\mu}$ depending on the subcarrier spacing configuration value μ may be defined as in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
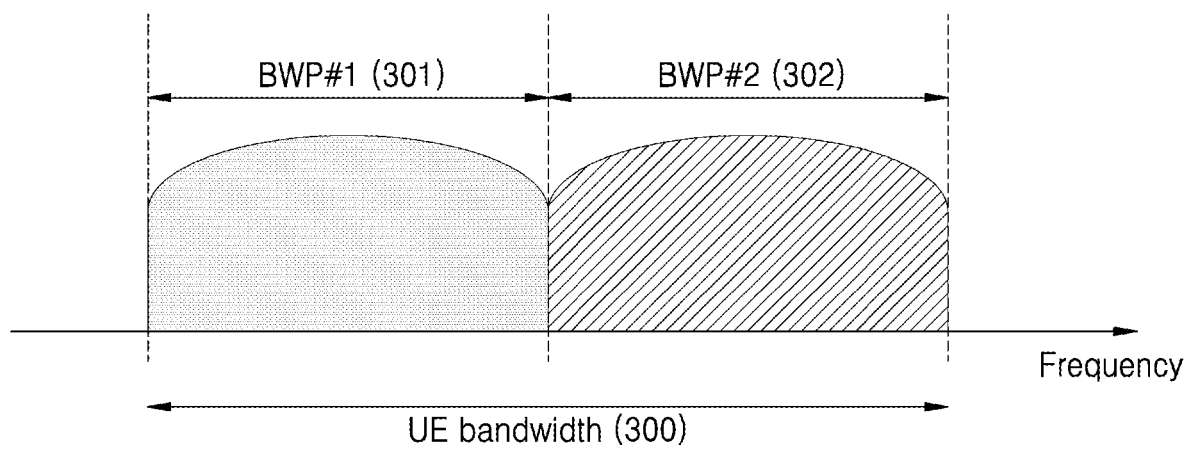
FIG. 3 is a diagram of a configuration of bandwidth parts (BWPs) of a mobile communication system, according to an embodiment of the disclosure.

FIG. 3 illustrates an example of configuring bandwidth parts (BWPs) in a 5G communication system, according to an embodiment of the disclosure.

Referring to FIG. 3, in an embodiment of the disclosure, two BWPs, BWP #1 301 and BWP #2 302 are configured in a UE bandwidth 300. A BS may configure one or more BWPs for the UE, and configure information as in the following Table 2 for each BWP.

TABLE 2

| BWP ::= | SEQUENCE { |
|---|---|
| bwp-Id | BWP-Id, |
| locationAndBandwidth | INTEGER (1 . . . 65536), |
| subcarrierSpacing | ENUMERATED {n0, n1, n2, n3, n4, n5}, |
| cyclicPrefix | ENUMERATED { extended } |
| } | |

The disclosure is not limited to the aforementioned examples, and apart from the configured information, various parameters related to the BWP may also be configured for the UE. The aforementioned information may be transmitted by higher layer signaling, e.g., radio resource control (RRC) signaling or in system information such as a master information block (MIB), from the BS to the UE. At least one of the configured one or more BWPs may be activated. Whether to activate a configured BWP may be notified from the BS to the UE semi-statically by RRC signaling or dynamically in DCI.

In an embodiment of the disclosure, the UE may be configured by the BS with an initial BWP for initial access in an MIB before the UE is RRC connected. For example, the UE may receive configuration information for a control resource set (CORESET) and search space in which a PDCCH may be transmitted for receiving system information (corresponding to remaining system information (RMSI) or system information block 1 (SIB1)) required for initial access in the MIB in an initial access process. The control resource set and search space configured in the MIB may each be regarded with identity (ID) 0.

The BS may notify the UE of configuration information, such as frequency allocation information, time allocation information, numerology, etc., for control resource set #0, in the MIB. The BS may also notify the UE of configuration information, such as a monitoring periodicity and occasion for the control resource set #0, i.e., configuration information for search space #0. The UE may regard a frequency region configured to the control resource set #0 obtained from the MIB as the initial BWP for initial access. In this case, the ID of the initial BWP may be regarded as 0.

Configuration of BWPs supported by the next generation mobile communication system (5G or NR system) may be used for various purposes.

In an embodiment of the disclosure, an occasion when the bandwidth supported by the UE is smaller than the system bandwidth may be addressed by BWP configuration of the BS. For example, the BS may configure the UE with frequency location of the BWP (configuration information 2), thereby allowing the UE to transmit or receive data in the particular frequency location in the system bandwidth.

Furthermore, in an embodiment of the disclosure, for the purpose of supporting different numerologies, the BS may configure a plurality of BWPs for the UE. For example, to support data transmission and reception using both a subcarrier spacing of 15 KHz and a subcarrier spacing of 30 KHz for a particular UE, the BS may configure two BWPs with subcarrier spacing of 15 KHz and 30 KHz, respectively. Different BWPs may be frequency division multiplexed. To transmit and receive data with particular subcarrier spacing, a BWP configured with the particular subcarrier spacing may be activated.

Moreover, in an embodiment of the disclosure, for the purpose of reducing power consumption of the UE, the BS may configure BWPs with different bandwidth sizes for the UE. For example, when a UE supports very large bandwidth, e.g., 100 MHz bandwidth, and always transmits or receives data in the bandwidth, the UE may consume very large power. In a situation where there is no traffic in particular, monitoring unnecessary DL control channel in the large 100 MHz bandwidth may be very inefficient in terms of power consumption. To reduce the power consumption of the UE, the BS may configure a BWP with relatively small bandwidth, e.g., a 20 MHz BWP, for the UE. In the situation that there is no traffic, the UE may perform monitoring in the 20

MHz BWP, and when data occurs, the UE may transmit or receive the data in the 100 MHz BWP under an instruction from the BS.

In the method of configuring BWPs, UEs may receive configuration information for the initial BWP in the MIB in an initial access process before being RRC connected. For example, the UE may be configured with a control region (e.g., a CORESET) for a DL control channel on which DCI may be transmitted to schedule an SIB, from an MIB of a physical broadcast channel (PBCH). Bandwidth of the control resource set configured in the MIB may be regarded as the initial BWP, and the UE may receive a PDSCH on which the SIB is transmitted in the initial BWP. The initial BWP may also be used for other system information (OSI), paging, or random access, apart from reception of the SIB.

A synchronization signal (SS)/PBCH block of the next generation mobile communication system (5G or NR system) will now be described.

The SS/PBCH block may refer to a physical layer channel block including a primary SS (PSS), a secondary SS (SSS), and a PBCH. For example, the SS/PBCH block may be defined as follows:

PSS: a reference signal for DL time/frequency synchronization, which may provide partial information of a cell ID.

SSS: a reference signal for DL time/frequency synchronization, which may provide the rest of the cell ID information not provided by the PSS. It may also serve as another reference signal for demodulation of the PBCH.

PBCH: a channel that may provide essential system information required for transmission or reception of data channel and control channel for UE. The essential system information may include search-space-related control information indicating radio resource mapping information of the control channel, scheduling control information for an extra data channel that transmits system information.

SS/PBCH block: SS/PBCH block is a combination of a PSS, a SSS, and a PBCH. One or more SS/PBCH blocks may be transmitted in 5 ms, and each of the SS/PBCH block may be distinguished by an index.

The UE may detect the PSS and the SSS in the initial access process, and decode the PBCH. The UE may obtain an MIB from the PBCH and may be configured with control resource set #0 in the MIB. The UE may assume that Demodulation Reference Signals (DMRS) transmitted in the selected SS/PBCH block and the control resource set #0 are quasi-colocated (QCL), and perform monitoring on the control resource set #0. The UE may receive system information in the DL control information transmitted in the control resource set #0. The UE may obtain random-access-channel (RACH) related configuration information required for initial access from the received system information. The UE may transmit a physical RACH (PRACH) to the BS in consideration of the selected SS/PBCH index, and on reception of the PRACH, the BS may obtain information about the SS/PBCH block index selected by the UE. The BS may know that the UE has selected any of the respective SS/PBCH blocks and that the UE is monitoring the control resource set #0 corresponding to (or associated with) the selected SS/PBCH.

DCI in the next generation mobile communication system (5G or NR system) will now be described in detail.

In the next generation mobile communication system (5G or NR system), scheduling information for UL data (or physical uplink shared channel (PUSCH)) or DL data (or physical downlink shared channel (PDSCH)) may be transmitted from the BS to the UE in the DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted on the physical downlink control channel (PDCCH) after going through channel coding and modulation processes. Cyclic redundancy check (CRC) may be appended to a DCI message payload, and the CRC may be scrambled by a radio network temporary identifier (RNTI) that corresponds to an ID of the UE. Depending on the use of the DCI message, e.g., UE-specific data transmission, power control command, random access response, or the like, different RNTIs may be used for scrambling of the CRC appended to a payload of the DCI message. In other words, the RNTI may be transmitted not explicitly but in a CRC calculation process. When receiving the DCI message on the PDCCH, the UE may check the CRC using the allocated RNTI. When the result of the CRC check is correct, the UE may determine that the message is transmitted to the UE.

For example, DCI that schedules a PDSCH for system information (SI) may be scrambled by SI-RNTI. DCI that schedules a PDSCH for a random access response (RAR) message may be scrambled by RA-RNTI. DCI that schedules a PDSCH for a paging message may be scrambled by P-RNTI. DCI that notifies a slot format indicator (SFI) may be scrambled by SFI-RNTI. DCI that notifies a transmit power control (TPC) may be scrambled by TPC-RNTI. DCI that schedules UE-specific PDSCH or PUSCH may be scrambled by Cell RNTI (C-RNTI).

DCI format 0_0 may be used for the fallback DCI that schedules the PUSCH, in which case the CRC may be scrambled by C-RNTI. In an embodiment of the disclosure, the DCI format 0_0 with the CRC scrambled by C-RNTI may include information as in Table 3.

TABLE 3

Identifier for DCI formats - [1] bit
Frequency domain resource assignment -
[ $\lceil \log_2(N_{RB}^{UL,BWP}(N_{RB}^{UL,BWP} + 1)/2) \rceil$ ] bits
   Time domain resource assignment - X bits
   Frequency hopping flag - 1 bit.
   Modulation and coding scheme - 5 bits
   New data indicator - 1 bit
   Redundancy version - 2 bits
   HARQ process number - 4 bits
   TPC command for scheduled PUSCH (transmit power control$^{(TPC)}$) -
[2] bits
   UL/SUL indicator (supplementary UL$^{(SUL)}$) - 0 or 1 bit DCI format 0_1 may be used for the non-fallback DCI that schedules the PUSCH, in which case the CRC may be scrambled by C-RNTI. In an embodiment of the disclosure, the DCI format 0_1 with the CRC scrambled by C-RNTI may include information as in Table 4.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment -1, 2, 3, or 4 bits
VRB-to-PRB(virtual resource block -to- physical resource block)
mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-
    ACK codebook
2nd downlink assignment index - 0 or 2 bits
    2 bits for dynamic HARQ-ACK codebook with two HARQ-
    ACK sub-codebooks
0 bit otherwise.
TPC command for scheduled PUSCH -2 bits SRS resource indicator – $\left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non-cookbook based PUSCH transmission $\lceil \log_2(N_{SRS}) \rceil$ bits for codebook based PUSH transmission
Precoding information and number of layers - up to 6 bits
Antenna ports - up to 5 bits
SRS request - 2 bits
CSI request - 0, 1, 2, 3, 4, 5, or 6 bits
CBG(code block group) transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used for the fallback DCI that schedules the PDSCH, in which case the CRC may be scrambled by C-RNTI. In an embodiment of the disclosure, the DCI format 1_0 with the CRC scrambled by C-RNTI may include information as in Table 5.

TABLE 5

Identifier for DCI formats - [1] bit
Frequency domain resource assignment -
[ $\lceil \log_2(N_{RB}^{DL,BWP}(N_{RB}^{DL,BWP} + 1)/2) \rceil$ ] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH(physical uplink control channel) resource indicator - 3 bits
PDSCH-to-HARQ feedback timing indicator - [3] bits DCI format 1_1 may be used for the non-fallback DCI that schedules the PUSCH, in which case the CRC may be scrambled by C-RNTI. In an embodiment of the disclosure, the DCI format 1_1 with the CRC scrambled by C-RNTI may include information as in Table 6.

TABLE 6

Figure 4:
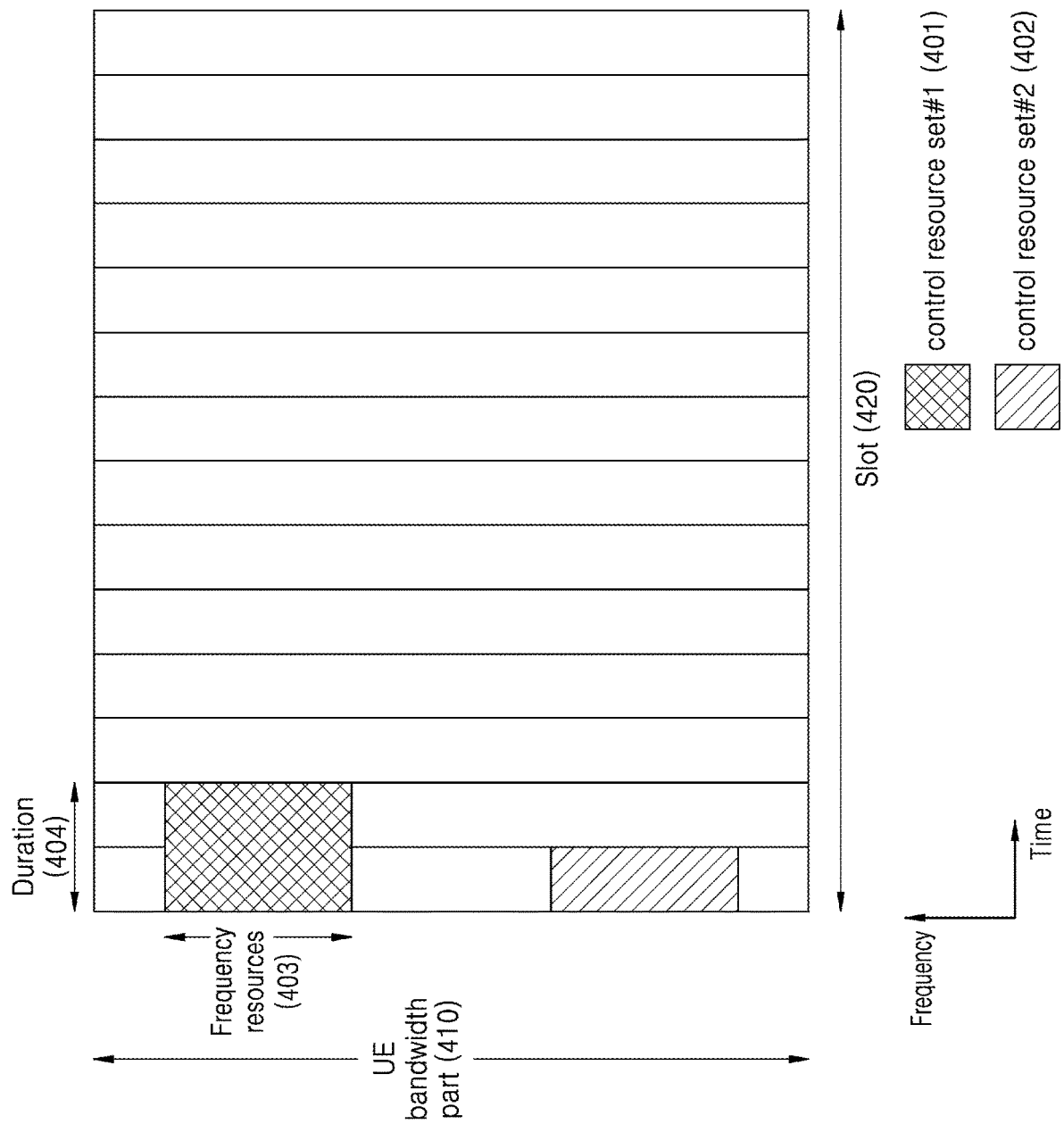
FIG. 4 is a diagram of a configuration of a control resource set of a downlink (DL) control channel of a mobile communication system, according to an embodiment of the disclosure.

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP} / P \rceil$ bits
    For resource allocation type 1, $\lceil \log_2(N_{RB}^{DL,BWP} (N_{RB}^{DL,BWP} +1)/ 2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 0 or 1 bit
Rate matching indicator - 0, 1, or 2 bits
ZP CSI-RS trigger - 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0, 2 or 4 bits
TPC command for scheduled PUCCH - 2 bits
PUCCH resource indicator - 3 bits TABLE 6-continued PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit FIG. 4 is a diagram for describing configuration of control resource sets of a DL control channel of a next generation mobile communication system, according to an embodiment of the disclosure. FIG. 4 illustrates an example of CORE-SETs in which a DL control channel is transmitted in the 5G wireless communication system, according to an embodiment of the disclosure.

Referring to FIG. 4, UE BWP 410 is configured on the frequency axis, and two control resource sets, control resource set #1 401 and control resource set #2 402, are configured on the time axis in a slot 420. The control resource sets 401 and 402 may be configured in a particular frequency resource 403 in the entire UE BWP 410 on the frequency axis. The control resource sets 401 and 402 may be configured with one or more OFDM symbols on the time axis, and defined by control resource set duration 404. Referring to FIG. 4, the control resource set #1 401 may be configured to have the control resource set duration of two symbols, and the control resource set #2 402 may be configured to have the control resource set duration of one symbol.

As described above, in the next generation mobile communication system (5G or NR system), the control resource set may be configured by the BS for the UE through higher layer signaling, e.g., system information, an MIB, or RRC signaling. Configuring of the UE with the control resource set refers to providing the UE with information such as a control resource set ID, a frequency location of the control resource set, length of symbols of the control resource set, etc. For example, configuration of the control resource set may include information as in Table 7.

TABLE 7

ControlResourceSet ::=                          SEQUENCE {
  -- Corresponds to L1 parameter               'CORESET-ID'
  controlResourceSetId
    ControlResourceSetId,
  frequencyDomainResources                     BIT STRING (SIZE
  (45)),
  duration                                     INTEGER
    (1 . . . maxCoReSetDuration),
  cce-REG-MappingType                          CHOICE {
    interleaved                                SEQUENCE {
      reg-BundleSize                           ENUMBERATED {n2,
  n3, n6},
      precoderGranularity                      ENUMERATED
  {sameAsREG-bundle, allContiguousRBs},
      interleaverSize                          ENUMERATED {n2,
  n3, n6}
      shiftIndex
        INTEGER(0 . . . maxNrofPhysicalResourceBlocks-1)
    },
    nonInterleaved                             NULL
  },
  tci-StatesPDCCH                              SEQUENCE (SIZE
    (1 . . . maxNrofTCI-StatesPDCCH) )OF TCI-StateId
  tci-PresentInDCI                             ENUMERATED {enabled}
}

In Table 7, tci-StatesPDCCH (hereinafter, called 'TCI state') configuration information may include information about one or more SS/PBCH block indexes having the QCL relation with the DMRS transmitted in the corresponding control resource set or channel state information reference signal (CSI-RS) indexes.

Figure 5:
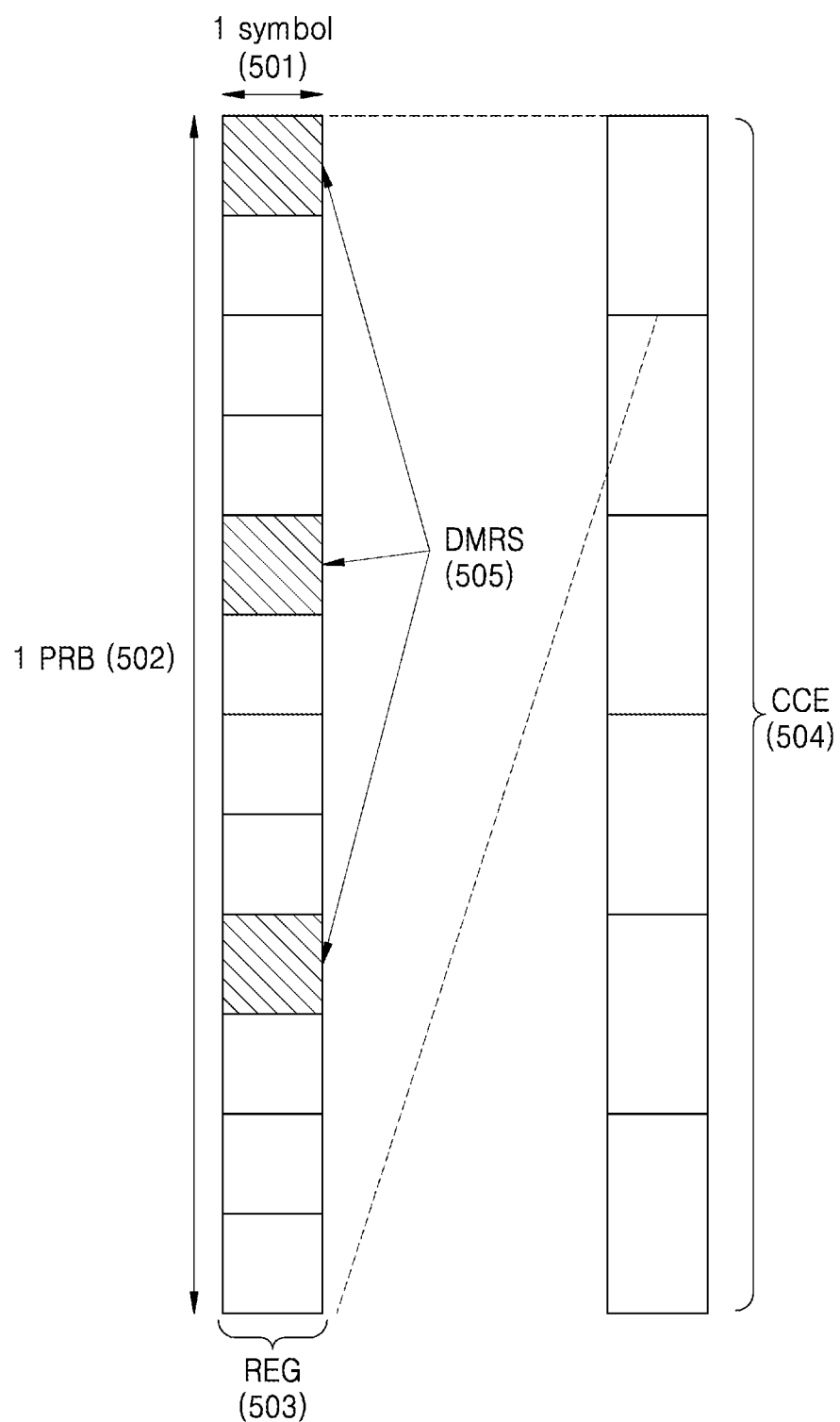
FIG. 5 is a diagram of a structure of a DL control channel of a mobile communication system, according to an embodiment of the disclosure.

FIG. 5 is a diagram for describing a structure of a DL control channel of a next generation mobile communication system, according to an embodiment of the disclosure.

FIG. 5 illustrates an example of a basic unit of time and frequency resource that forms a DL control channel to be used in 5G, according to an embodiment of the disclosure.

Referring to FIG. 5, the basic unit of time and frequency resource that forms a control channel may be defined as a resource element group (REG) 503. The REG 503 may be defined by one OFDM symbol 501 on the time axis and one physical resource block (PRB) 502, i.e., 12 subcarriers, on the frequency axis. The BS may configure a DL control channel allocation unit by connecting REGs 503.

In FIG. 5, when the DL control channel allocation unit is called a control channel element (CCE) 504 in 5G, the one CCE 504 may include a plurality of REGs 503. For example, as shown in FIG. 5, the REG 503 may include 12 REs, and when one CCE 504 includes 6 REGs 503, the one CCE 504 may include 72 REs. When the DL control resource set is configured, it may include a plurality of CCEs 504, and a particular DL control channel may be transmitted by being mapped to one or more CCEs 504 based on an aggregation level (AL) in the control resource set. The CCEs 504 in the control resource set may be distinguished by numbers, which may be allocated to the CCEs 504 in a logical mapping method.

The basic unit of the DL control channel as shown in FIG. 5, i.e., the REG 503, may include both REs to which DCI is mapped and an area to which DMRS 505 that is a reference signal for decoding the DCI is mapped. As shown in FIG. 5, three DMRS 505 may be transmitted in one REG 503. The number of CCEs required to transmit the PDCCH may be 1, 2, 4, 8, or 16 depending on the AL, and different numbers of CCEs may be used to implement link adaptation of the DL control channel. For example, when AL=L, a single downlink control channel may be transmitted in L CCEs.

The UE needs to detect a signal without knowing of information about the DL control channel, and a search space representing a set of CCEs may be defined for the blind decoding. The search space may be a set of DL control channel candidates including CCEs to be attempted by the UE for decoding at a given AL. As there may be various ALs to have 1, 2, 4, 8, or 16 CCEs into a group, the UE may have a plurality of search spaces. A search space set may be defined as a set of search spaces at all the set ALs.

The search spaces may be classified into common search spaces and UE-specific search spaces. In an embodiment of the disclosure, a certain group of UEs or all the UEs may check into a common search space of the PDCCH to dynamically schedule the system information or receive cell-common control information, such as a paging message.

For example, the UE may receive PDSCH scheduling allocation information for transmitting an SIB including cell operator information or the like by checking into the common search space of the PDCCH. For the common search space, a certain group of UEs or all the UEs need to receive the PDCCH, so the common search space may be defined as a set of pre-appointed CCEs. The UE may receive the UE-specific PDSCH or PUSCH scheduling allocation information by checking into the UE-specific search space of the PDCCH. The UE-specific search space may be UE-specifically defined as a function of various system parameters and an ID of the UE.

In the 5G system, parameters of the search space of the PDCCH may be configured by the BS for the UE in higher layer signaling (e.g., SIB, MIB, or RRC signaling). For example, the BS may configure the number of PDCCH candidates at each AL L, monitoring periodicity for the search space, monitoring occasion in symbols in the slot for the search space, a type of the search space (common search space or UE-specific search space), a combination of a DCI format to be monitored in the search space and an RNTI, a control resource set index to monitor the search space, etc., for the UE. For example, the configuration may include information as in Table 8.

TABLE 8

```
SearchSpace ::=                       SEQUENCE {
-- Identity of the search space. SearchSpaceId = 0
   identifies the SearchSpace configured via PBCH
   (MIB) or ServingCellConfigCommon.
searchSpaceId                         SearchSpaceId,
controlResourceSetId
   ControlResourceSetId,
monitoringSlotPeriodicityAndOffset    CHOICE {
   sl1                                NULL,
   sl2                                INTEGER (0 . . . 1),
   sl4                                INTEGER (0 . . . 3),
   sl5                                INTEGER (0 . . . 4),
   sl8                                INTEGER (0 . . . 7),
   sl10                               INTEGER (0 . . . 9),
   sl16                               INTEGER (0 . . . 15),
   sl20                               INTEGER (0 . . . 19)
}
duration                              INTEGER
(2 . . . 2559)
monitoringSymbolsWithinSlot           BIT STRING
(SIZE (14))                           OPTIONAL,
nrofCandidates                        SEQUENCE {
   aggregationLevel1                  ENUMERATED {n0, n1,
   n2, n3, n4, n5, n6, n8},
   aggregationLevel2                  ENUMERATED {n0, n1,
   n2, n3, n4, n5, n6, n8},
   aggregationLevel4                  ENUMERATED {n0, n1,
   n2, n3, n4, n5, n6, n8},
   aggregationLevel8                  ENUMERATED {n0, n1,
   n2, n3, n4, n5, n6, n8},
   aggregationLevel16                 ENUMERATED {n0, n1,
   n2, n3, n4, n5, n6, n8}
},
searchSpaceType                       CHOICE {
-- Configures this search space as common search
space (CSS) and DCI formats to monitor.
   common                             SEQUENCE {
   }
   ue-Specific                        SEQUENCE {
   -- Indicates whether the UE monitors in this USS
   for DCI formats 0-0 and 1-0 or for formats 0-1 and
   1-1.
      formats                         ENUMERATED {formats0-
   0-And-1-0, formats0-1-And-1-1},
   . . .
   }
```

Based on the configuration information, the BS may configure the UE with one or more search space sets. In an embodiment of the disclosure, the BS may configure the UE with search space set 1 and search space set 2, configure the UE to monitor DCI format A scrambled by X-RNTI in the search space set 1 in the common search space and monitor DCI format B scrambled by Y-RNTI in the search space set 2 in the UE-specific search space.

The configuration information may indicate that there are one or more search space sets in the common or UE-specific search space. For example, search space set #1 and search space set #2 may be configured as the common search space, and search space set #3 and search space set #4 may be configured as the UE-specific search space.

In the common search space, the following combinations of DCI formats and RNTIs may be monitored. It is, of course, not limited to the following example.
DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the UE-specific search space, the following combinations of DCI formats and RNTIs may be monitored. It is, of course, not limited to the following example.
DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The enumerated RNTIs may follow the following definitions and uses.

C-RNTI (Cell RNTI): used for UE-specific PDSCH scheduling

TC-RNTI (Temporary Cell RNTI): used for UE-specific PDSCH scheduling

CS-RNTI (Configured Scheduling RNTI): used for semi-statically configured UE-specific PDSCH scheduling RA-RNTI (Random Access RNTI): used for PDSCH scheduling in a random access process P-RNTI (Paging RNTI): used for scheduling a PDSCH on which paging is transmitted SI-RNTI (System Information RNTI): used for scheduling a PDSCH on which system information is transmitted INT-RNTI (Interruption RNTI): used for indicating whether to puncture the PDSCH TPC-PUSCH-RNTI (Transmit Power Control for PUSCH RNTI): used for indicating power control command for a PUSCH TPC-PUCCH-RNTI (Transmit Power Control for PUCCH RNTI): used for indicating power control command for a PUCCH TPC-SRS-RNTI (Transmit Power Control for SRS RNTI): used for indicating power control command for an SRS In an embodiment of the disclosure, the DCI formats as described above may be defined as in Table 9.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In an embodiment of the disclosure, in the 5G system, with control resource set p and search space set s, a search space at AL L may be expressed as in Equation 1.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{Equation 1}$$

-continued

L: Aggregation level
$n_{CI}$: Carrier index $N_{CCE,p}$: Total number of CCE in control resource set $p$
$n_{s,f}^{\mu}$: slot index
$M_{p,s,max}^{(L)}$: Number of PDCCH candidates at $AL = L$
$m_{nCI} = 0, \ldots , M_{p,s,max}^{(L)} - 1$:
Index of PDCCH candidates at $AL = L$
$i = 0, \ldots , L - 1$
$Y_{p,n_{s,f}^{\mu}} = (A_p \cdot Y_{p,n_{s,f}^{\mu}-1}) \bmod D$,
$Y_{p-1} = n_{RNTI} \neq 0, A_0 = 39827$,
$A_1 = 39829, A_2 = 39839, D = 65537$
$nRNTI$: UE identifier In an embodiment of the disclosure, the value of $Y_{p,n_{s,f}^{\mu}}$ may correspond to 0 for common search space.

In an embodiment of the disclosure, the value of $Y_{p,n_{s,f}^{\mu}}$ may correspond to a value that changes according to UE Identity (C-RNTI or ID configured by the BS for the UE) and time index for the UE-specific search space.

In an embodiment of the disclosure, in 5G, a plurality of search space sets may be configured with different parameters (e.g., parameters as in table 8). Accordingly, the set of search spaces to be monitored by the UE may vary at each point in time. For example, when the search space set #1 is configured with X-slot periodicity and the search space set #2 is configured with Y-slot periodicity, where X and Y are different, the UE may monitor both the search space set #1 and the search space set #2 in a particular slot, and monitor one of the search space set #1 and the search space set #2 in another particular slot.

When a plurality of search space sets are configured for the UE, the following conditions may be taken into account to determine a search space set to be monitored by the UE.

Condition 1: Restriction on the Maximum Number of PDCCH Candidates

The number of PDCCH candidates to be monitored per slot may not exceed $M^{\mu}$. $M^{\mu}$ may be defined as the maximum number of PDCCH candidates per slot in a cell configured with subcarrier spacing of $15 \cdot 2^{\mu}$ kHz, as in Table 10.

TABLE 10

| μ | Maximum number of PDCCH candidates per slot and per serving cell ($M^{\mu}$) |
|---|---|
| 0 | 44 |
| 1 | 36 |
| 2 | 22 |
| 3 | 20 |

Condition 2: Restriction on the Maximum Number of CCEs

The number of CCEs constituting the entire search space (the entire search space herein refers to an entire CCE set corresponding to a union region of a plurality of search space sets) per slot may not exceed $C^{\mu}$. $C^{\mu}$ may be defined as the maximum number of CCEs per slot in a cell configured with subcarrier spacing of $15.2^{\mu}$ kHz, as in Table 11.

TABLE 11

| μ | Maximum number of CCEs per slot and per serving cell ($C^{\mu}$) |
|---|---|
| 0 | 56 |
| 1 | 56 |
| 2 | 48 |
| 3 | 32 |

For convenience of explanation, a situation that satisfies both the conditions 1 and 2 at a particular time may be defined as "condition A." Accordingly, failing to satisfy the condition A may mean that at least one of the conditions 1 or 2 is not satisfied.

Depending on how the BS configures the search space sets, there may be an occasion when the condition A is not satisfied at a particular time. On the occasion when the condition A is not satisfied at the particular time, the UE may select and monitor some of the search space sets, which are configured to satisfy the condition A at the time, and the BS may transmit a PDCCH in the selected search space set.

In an embodiment of the disclosure, selecting some of the entire search space sets may be performed in the following methods.

Method 1

When the condition A for the PDCCH is not satisfied in a particular time (slot), The UE may select a search space set having the search space type configured as the common search space over a search space set configured for the UE-specific search space, from among the search space sets that exist at the time.

When all the search space sets configured for the common search space are selected (i.e., when the condition A is satisfied although all the search space configured for the common search space is selected), the UE (or the BS) may select search space sets configured for the UE-specific space. In this case, when there are a plurality of search space sets configured for the UE-specific search space, a search space set with a lower search space index may have higher priority. Considering the priorities, the UE or the BS may select UE-specific search space sets as long as the UE-specific search space sets satisfy the condition A.

A time domain resource allocation method for a data channel in the next generation mobile communication system (5G or NR system) will now be described.

The BS may configure the UE with a table of time domain resource allocation information for a DL data channel (physical downlink shared channel, PDSCH) and a UL data channel (physical uplink shared channel, PUSCH) by higher layer signaling (e.g., RRC signaling). For the PDSCH, a table including up to 16 (maxNrofDL-Allocations=16) entries may be configured, and for the PUSCH, a table including up to 16 (maxNrofUL-Allocations=16) entries may be configured. In an embodiment of the disclosure, the time domain resource allocation information may include PDCCH-to-PDSCH slot timing (corresponding to a time interval in slots between PDCCH reception time and PDSCH transmission time scheduled on the received PDCCH, and denoted as K0), PDCCH-to-PUSCH slot timing (corresponding to a time interval in slots between PDCCH reception time and PUSCH transmission time scheduled on the received PDCCH, and denoted as K2), information about location and length of a start symbol scheduled on the PDSCH or the PUSCH in the slot, a mapping type of PDSCH or PUSCH, etc. For example, information as in Table 12 or Table 13 may be notified from the BS to the UE.

TABLE 12

PDSCH-TimeDomainResourceAllocationList information element

```
PDSCH-TimeDomainResourceAllocationList ::=    SEQUENCE
(SIZE(1 . . . maxNrofDL-Allocations)) OF PDSCH-
TimeDomainResourceAllocation
PDSCH-TimeDomainResourceAllocation ::=SEQUENCE {
  k0
  INTEGER(0 . . . 32)
  OPTIONAL, -- Need S
    mappingType                                ENUMERATED
  {typeA, typeB},
    startSymbolAndLength                       INTEGER
  (0 . . . 127)
}
```

TABLE 13

PUSCH-TimeDomainResourceAllocation information element

```
PUSCH-TimeDomainResourceAllocationList ::= SEQUENCE
(SIZE(1 . . . maxNrofUL-Allocations)) OF PUSCH-
TimeDomainResourceAllocation
PUSCH-TimeDomainResourceAllocation ::= SEQUENCE {
  k2
  INTEGER(0 . . . 32)      OPTIONAL, -- Need S
    mappingType                                ENUMERATED
  {typeA, typeB},
    startSymbolAndLength                       INTEGER
  (0 . . . 127)
}
```

The BS may notify the UE of at least one of the entries in the table about the time domain resource allocation information by L1 signaling (e.g., in DCI, in particular in a 'time domain resource allocation' field in the DCI). The UE may obtain the time domain resource allocation information for the PDSCH or the PUSCH based on the DCI received from the BS.

A method of measuring and reporting a channel state in the next generation mobile communication system (5G or NR system) will now be described.

Channel state information (CSI) may include channel quality information (CQI), a precoding matrix indicator (PMI), a CSI-RS resource indicator (CRI), an SS/PBCH block resource indicator (SSBRI), a layer indicator (LI), a rank indicator (RI), and/or L1 reference signal received power (L1-RSRP). The BS may control time and frequency resources for the aforementioned CSI measurement and report of the UE.

For the aforementioned CSI measurement and report, the UE may be configured with configuration information for N (≥1) CSI report (CSI-ReportConfig), configuration information for M (≥1) RS transmission resources (CSI-ResourceConfig), information about one or two trigger state lists (CSI-AperiodicTriggerStateList, CSI-SemiPersistentOnPUSCH-TriggerStateList) in higher layer signaling.

Figure 6:
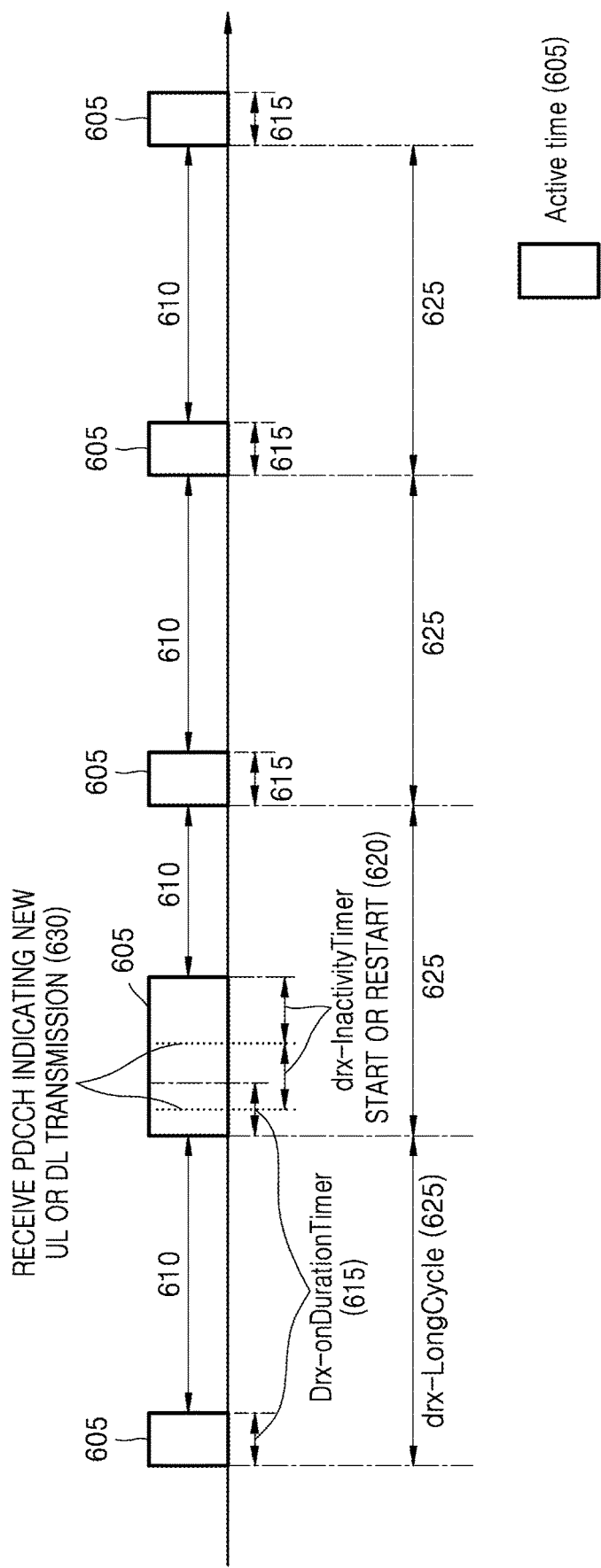
FIG. 6 is a diagram of discontinuous reception (DRX), according to an embodiment of the disclosure.

FIG. 6 is a diagram for describing Discontinuous Reception (DRX), according to an embodiment of the disclosure.

DRX is an operation of the UE, which is using a service, to discontinuously receive data while in an RRC connected state in which a radio link is set up between the UE and the BS. When DRX is applied, the UE may turn on a receiver at a specified time to monitor a control channel and turn off the receiver when receiving no data for a certain period of time, thereby reducing power consumption of the UE. The DRX operation may be controlled by a media access control (MAC) layer apparatus based on various parameters and timers.

Referring to FIG. 6, Active Time 605 is a period of time in which the UE wakes up in every DRX cycle and monitors a PDCCH. The Active Time 605 may be defined as follows:

drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

drx-onDurationTimer, drx-InactivityTimer, drx-RetransmissionTimerDL, drx-RetransmissionTimerUL, ra-ContentionResolutionTimer, etc., are timers whose values are configured by the BS, and have a function to configure the UE to monitor a PDCCH when a certain condition is met.

drx-onDurationTimer 615 is a parameter to configure a minimum time for which the UE stays awake. drx-InactivityTimer 620 is a parameter to configure an extra period of time for which the UE additionally stays awake when a PDCCH indicating a new UL or DL transmission 630 is received. drx-RetransmissionTimerDL is a parameter to configure a maximum period of time for which the UE stays awake to receive DL retransmission in a DL HARQ process. drx-RetransmissionTimerUL is a parameter to configure a maximum period of time for which the UE stays awake to receive UL retransmission grant in a UL HARQ process. The drx-onDurationTimer, drx-InactivityTimer, drx-RetransmissionTimerDL, and drx-RetransmissionTimerUL may be configured with, e.g., time, the number of subframes, or the number of slots. ra-ContentionResolutionTimer is a parameter to monitor the PDCCH in a random access process.

InActive Time 610 is a time for which monitoring or receiving the PDCCH is not required during the DRX operation. The InActive Time 610 may be all the time of performing the DRX operation other than the Active Time 605. The UE may go into the sleep or inactive state to reduce power consumption while not monitoring the PDCCH during the Active Time 605.

The DRX cycle refers to a cycle in which the UE wakes up and monitors the PDCCH. For example, it refers to a time gap from after the UE monitors the PDCCH to a time to monitor the next PDCCH, or an occurrence cycle of on duration. The DRX cycles have two types: a short DRX cycle 705 (also referred to as drx-ShortCycle) and a long DRX cycle 625 (also referred to as drx-LongCycle). The short DRX cycle 705 may be optionally applied.

The long DRX cycle 625 is a longer one of two DRX cycles configured for the UE. The UE starts drx-onDurationTimer 615 again at a point in time after the lapse of long DRX cycle 625 from a starting point (e.g., a start symbol) of drx-onDurationTimer 615 during the long DRX operation. The short DRX cycle will be described with reference to FIG. 7.

While operating in the long DRX cycle 625, the UE may start the drx-onDurationTimer 615 in a slot after drx-SlotOffset from a subframe that satisfies the following Equation 2. The drx-SlotOffset refers to a delay before the drx-onDurationTimer 615 starts. The drx-SlotOffset may be configured with, e.g., time, the number of slots, etc.

$$[(SFN \times 10) + \text{subframe number}] \, \text{modulo} \, (drx\text{-Long-Cycle}) = drx\text{-StartOffset} \quad \text{Equation 2}$$

where long DRX cycle 625 and drx-StartOffset (e.g., drx-LongCycleStartOffset), which may be used to define a subframe to start the long DRX cycle 625. The drx-StartOffset (e.g., drx-LongCycleStartOffset) may be configured with, e.g., time, the number of subframes, the number of slots, etc.

Figure 7:
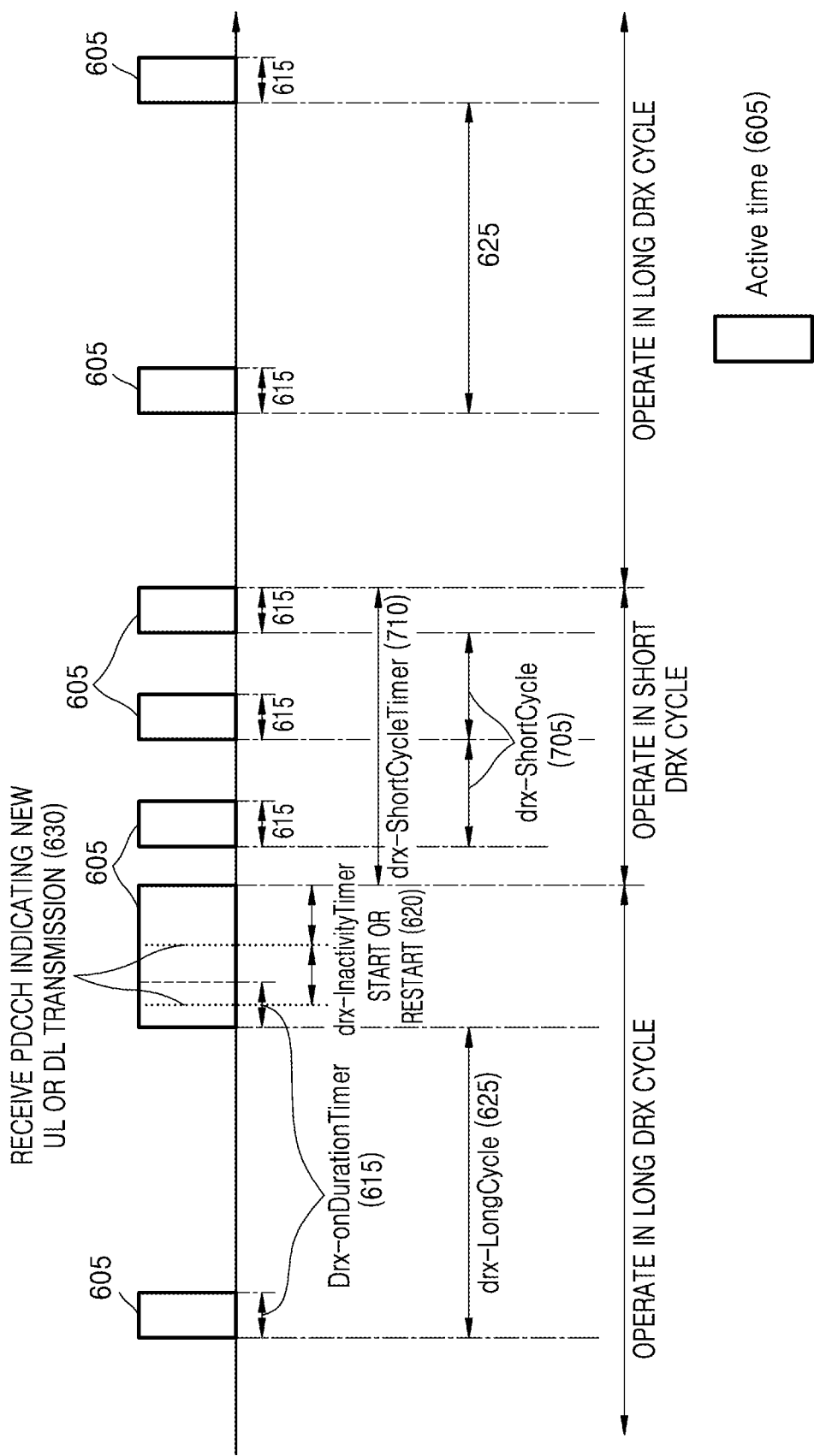
FIG. 7 is a diagram of long DRX and short DRX, according to an embodiment of the disclosure.

FIG. 7 is a diagram for describing long DRX and short DRX, according to an embodiment of the disclosure.

Referring to FIG. 7, short DRX cycle 705 is a shorter one of two DRX cycles defined for the UE. The UE operating in the long DRX cycle 625 starts or restarts the drx-InactivityTimer 620 when a certain event, e.g., reception of a PDCCH indicating new UL transmission or DL transmission 630, occurs in the Active Time 605, and operates in the short DRX cycle 705. For example, the UE starts drx-ShortCycleTimer 710 on expiry of the previous drx-onDurationTimer 615 or drx-InactivityTimer 620, and operates in the short DRX cycle until the expiry of the drx-ShortCycleTimer 710. The drx-ShortCycleTimer 710 may start or restart according to a MAC control element (CE) indicated by the BS. Upon reception of the PDCCH indicating the new UL transmission or DL transmission 630, the UE may look forward to future additional UL transmission or DL transmission and extend the Active Time 605 or delay the start of InActive Time 610. While operating in the short DRX cycle, the UE starts the drx-onDurationTimer 615 again at a point in time after the lapse of the short DRX cycle from the starting point of the previous on duration. After that, when the drx-ShortCycleTimer 710 is expired, the UE operates in the long DRX cycle 625 again.

While operating in the short DRX cycle 705, the UE may start the drx-onDurationTimer 615 after drx-SlotOffset in a subframe that satisfies Equation 3. The drx-SlotOffset refers to a delay before the drx-onDurationTimer 615 starts. The drx-SlotOffset may be configured with, e.g., time, the number of slots, etc.

$$[(SFN \times 10) + \text{subframe number}] \bmod (drx\text{-ShortCycle}) = (drx\text{-StartOffset}) \bmod (drx\text{-ShortCycle}) \quad \text{Equation 3}$$

where drx-ShortCycle and drx-StartOffset may be used to define a subframe to start the short DRX cycle 705. The drx-ShortCycle and the drx-StartOffset may be configured with, e.g., time, the number of subframes, the number of slots, etc.

DRX operation has thus far been described with reference to FIGS. 6 and 7. In an embodiment of the disclosure, the UE may reduce its power consumption by performing the DRX operation. Although the UE performs the DRX operation, the UE does not always receive the PDCCH related to the UE in the Active Time 605. Hence, in an embodiment of the disclosure, a signal to control operation of the UE to save power of the UE more efficiently may be provided.

In the next generation mobile communication system (5G or NR system), to reduce power consumption of the UE, various transmission or reception related parameters may be controlled by Layer 1 (L1) signaling. For example, the L1 signaling having the purpose of reducing power consumption of the UE may control at least one or a combination of parameters as in Table 14.

TABLE 14

| PDCCH related configuration parameter (e.g., PDCCH monitoring cycle, blind decoding count, aggregation level (AL), monitoring occasion, indicator about whether PDCCH is monitored) |
| BWP related configuration parameter (e.g., BWP index, bandwidth of BWP.) |
| CA related configuration parameter (e.g., CC index, CC activation or deactivation indicator) |
| DRX related configuration parameter (e.g., DRX cycle, DRX timer related parameter (onDurationTimer, Inactivity Timer, HARQ-RTT-Timer, RetransmissionTimer)) |
| Antenna related configuration parameter (e.g., the number of layers, the number of antenna ports, the number of antenna panels) |
| Time domain resource allocation related configuration parameter (PDCCH-to-PDSCH timing K0, PDCCH-to-PUSCH timing K2) |
| HARQ timing related configuration parameter (PDSCH-to-HARQ timing) |
| CSI-RS configuration information |
| UL power control information |
| Configuration information relating to other transmission/reception |

It is, of course, not limited thereto, and various parameter information that may be included in the L1 signaling transmitted for the purpose of reducing power consumption will now be described.

In an embodiment of the disclosure, the L1 signaling transmitted for the purpose of reducing power consumption may be referred to as a power saving signal (POSS). It is, however, not limited thereto, and the POSS may also be called other various terms, such as a power control signal, a power configuration signal, etc. For example, in an embodiment of the disclosure, the POSS may also be referred to as a wake up signal (WUS), a power control signal, a DRX activation signal, an on duration activation signal, an on duration timer activation signal (drx-onDurationTimer Activation Signal), etc.

Furthermore, in an embodiment of the disclosure, the UE may detect DCI corresponding to the POSS by monitoring a PDCCH. In this case, the DCI may be scrambled by a particular RNTI. The particular RNTI may be referred to as a WUS-RNTI, PS-RNTI, POSS-RNTI, or the like. Furthermore, the particular RNTI may be a newly defined RNTI or may use an existing RNTI. The UE may receive the POSS on the assumption that POSS is scrambled by the particular RNTI. In this case, the UE may de-scramble the POSS using the particular RNTI.

A POSS configuration method, and associated BS and UE operation methods will now be described according to the disclosure. For example, in a case of applying a POSS monitoring method, a PDCCH monitoring method performed by the UE based on the POSS, a POSS indication method, a POSS transmission method, operation on an occasion when no POSS is received, carrier aggregation (CA), BWPs, etc., a POSS configuration method and associated BS and UE operation methods will be described. In an embodiment of the disclosure, power consumption of UE for monitoring a PDCCH may be minimized. In the disclosure, in particular, a POSS configuration method in consideration of a DRX operation, and associated BS and UE operation methods will be described.

For convenience of explanation, the POSS will now be assumed to be a WUS. It is not, however, limited thereto, and the POSS may be called the aforementioned many different terms.

Hereinafter, embodiments of the disclosure are described in detail with reference to the accompanying drawings. Although the following embodiments of the disclosure will focus on the 5G system as an example, they may be equally applied to other communication systems with similar technical backgrounds or channel types. For example, the other communication systems with similar technical backgrounds or channel types may include LTE or LTE-A mobile communication systems and any mobile communication technology developed after 5G. Accordingly, embodiments of the disclosure will also be applied to other communication systems through some modifications to an extent that does not significantly deviate from the scope of the disclosure when judged by those of ordinary skill in the art.

In the description of the disclosure, when it is determined that a detailed description of related functions or configurations may unnecessarily obscure the subject matter of the disclosure, the detailed description will be omitted. Further, terms, as will be mentioned later, are defined by taking functionalities in the disclosure into account, but may vary depending on practices or intentions of users or operators. Accordingly, the terms should be defined based on the descriptions throughout this specification.

Figure 8:
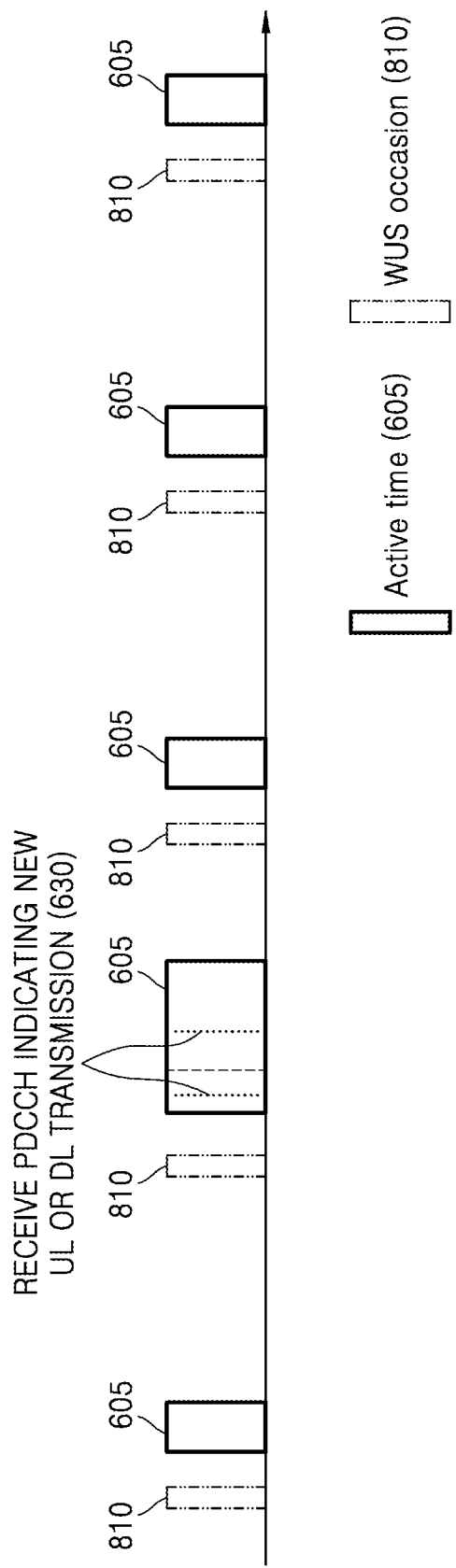
FIG. 8 is a diagram of a wake up signal (WUS), according to an embodiment of the disclosure.

FIG. 8 is a diagram for describing a WUS, according to an embodiment of the disclosure.

As described above, the WUS is a signal to be transmitted for the purpose of reducing power consumption of the UE. In an embodiment of the disclosure, the WUS may indicate whether the UE is to wake up for monitoring a PDCCH. For example, the WUS may indicate whether the UE is to wake up on a DRX occasion to monitor the PDCCH. Furthermore, the WUS may be transmitted on the PDCCH, and the UE may detect DCI corresponding to the WUS by monitoring the PDCCH. In the disclosure, the UE may receive DCI corresponding to a POSS detected by monitoring the PDCCH. In this case, the DCI may be scrambled by a particular RNTI. The particular RNTI may be a newly defined RNTI or may use an existing RNTI. The UE may receive a WUS on the assumption that the WUS is scrambled by the particular RNTI. In this case, the UE may de-scramble the WUS using the particular RNTI. In an embodiment of the disclosure, the DCI may be UE-specific DCI, or group-common DCI. In the following description, for convenience of explanation, an operation of receiving DCI corresponding to a WUS by monitoring a PDCCH is called a WUS monitoring operation. Furthermore, receiving a WUS may be used as having the same meaning as receiving DCI corresponding to the WUS.

Referring to FIG. 8, when a WUS monitoring operation is configured, the UE may receive the WUS on a PDCCH in a time region configured for the UE to wake up on every DRX occasion to monitor the PDCCH, i.e., a particular time region before the Active Time 605. The particular time region for receiving the WUS is called a WUS occasion 810. In an embodiment of the disclosure, the WUS occasion 810 may be located before an offset configured at least from a starting point of the DRX occasion, the DRX on duration, the on duration timer activation (drx-onDurationTimer Activation), or the Active Time 605, which is a time region for receiving or monitoring the PDCCH while the UE is in DRX operation. The offset may be configured with time, the number of slots, or the number of subframes.

In FIG. 8, the WUS occasion 810 is shown as being located in the Inactive Time 610, which is time for which the UE does not need to monitor the PDCCH while in the DRX operation, i.e., time configured for the UE not to receive the PDCCH, but it is not limited thereto. For example, the WUS occasion 810 may be located in the Active Time 605. This will be described later in detail.

When the UE detects a WUS by monitoring the PDCCH in the WUS occasion 810, the UE may or may not monitor the PDCCH in a time region configured as the Active Time 605 according what is indicated by the WUS. For example, the UE may wake up on the DRX occasion based on indication of the WUS and monitor the PDCCH in the configured Active Time 605, or may not wake up when the DRX occasion comes, skip the configured Active Time 605, and keep in the sleep or inactive state in the InActive Time 610.

In an embodiment of the disclosure, the WUS may indicate that the UE is to wake up on a DRX occasion related to the WUS, that the UE is not to skip the DRX occasion related to the WUS, that the UE is to monitor the PDCCH on the DRX occasion related to the WUS, or start drx-onDurationTimer 615 on the DRX occasion related to the WUS. Additionally or alternatively, the WUS may not indicate that the UE is to wake up on the DRX occasion related to the WUS, or may indicate that the UE is not to wake up on the DRX occasion related to the WUS, that the UE is not to monitor the PDCCH on the DRX occasion related to the WUS, or that the UE is not to start the drx-onDurationTimer 615 on the DRX occasion related to the WUS, or may indicate that the UE is to skip the DRX occasion related to the WUS.

In an embodiment of the disclosure, the WUS occasion 810 is shorter in length than the Active Time 605. Hence, the time for which the receiver is turned on to receive and monitor the PDCCH on the WUS occasion 810 is shorter than the time for which the receiver is turned on to receive and monitor the PDCCH in the Active Time 605. Thus, the UE may reduce power consumption of the UE by monitoring a PDCCH when there is a PDCCH to be received, based on the WUS.

Figure 9:
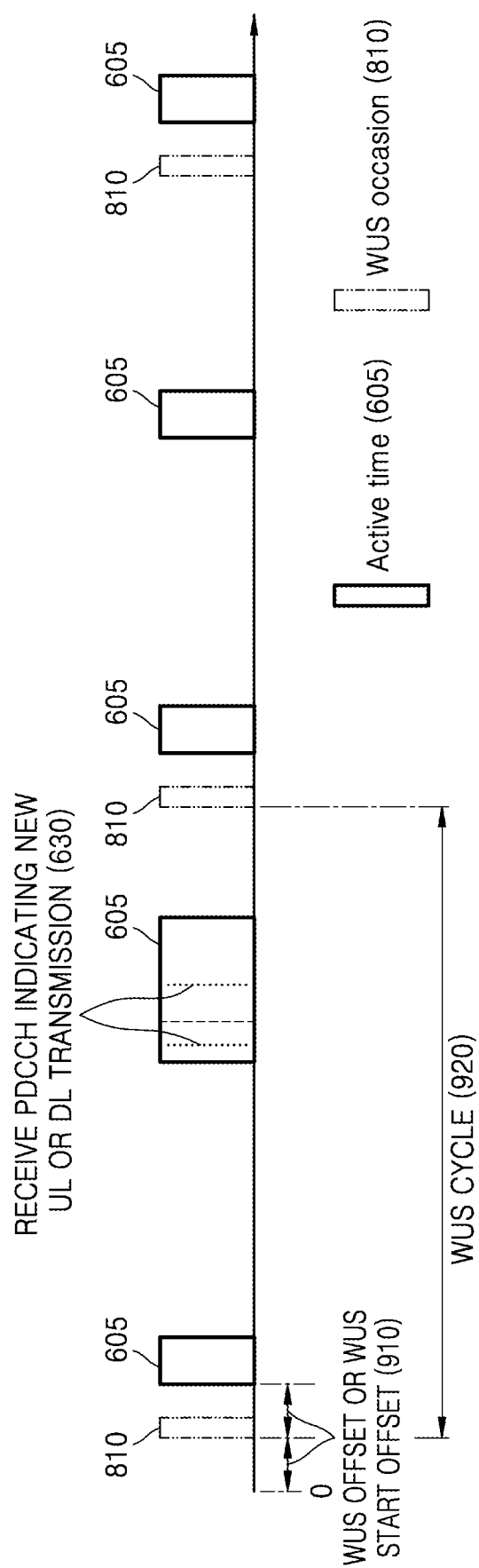
FIG. 9 is a diagram illustrating identification of a WUS occasion region, according to an embodiment of the disclosure.

FIG. 9 is a diagram for describing how to identify a WUS occasion region, according to an embodiment of the disclosure.

Referring to FIG. 9, the BS may indicate a WUS occasion region to the UE. For example, the BS may provide WUS configuration information for the UE by higher layer signaling (RRC signaling, in an MIB, or in an SIB). In an embodiment of the disclosure, the WUS configuration information may include WUS offset (WUS-Offset) or WUS start offset (WUS-StartOffset) 910, and a WUS cycle 920. The BS may configure a WUS monitoring operation for the UE by transmitting the WUS configuration information. The UE may monitor a PDCCH based on the WUS configuration information provided by the BS to detect DCI corresponding to the WUS.

Embodiment 1-1

In the embodiment 1-1 of the disclosure, a method in which the BS configures a WUS monitoring operation for the UE independently of the DRX operation is provided.

In an embodiment of the disclosure, the BS may configure the WUS offset or WUS start offset (WUS-offset or WUS-StartOffset) 910 and the WUS cycle 920 for the UE, independently of the DRX occasion, which is a time region in which the UE may receive or monitor a PDCCH. This means, however, that the WUS may be configured independently of the DRX operation, and the WUS configuration information may be represented using parameters of the DRX configuration information. In an embodiment of the disclosure, the WUS may be operated by considering the DRX operation or independently of the DRX operation, but on any occasion, the BS may configure the WUS occasion for the UE independently of the DRX operation.

In an embodiment of the disclosure, the BS may configure the WUS offset or WUS start offset (WUS-offset or WUS-StartOffset) 910, and the WUS cycle 920 to arbitrary values for the UE. The WUS cycle 920 may be configured with, e.g., time, the number of subframes, the number of slots, etc. Furthermore, the WUS offset or WUS start offset (WUS-offset or WUS-StartOffset) 910 may also be configured with time, the number of subframes, the number of slots, etc. Furthermore, the WUS offset or WUS start offset (WUS-offset or WUS-StartOffset) 910 may have a negative value. In addition, the WUS offset may have an absolute value, i.e., with respect to subframe 0, or have a relative value to the drx-StartOffset.

In an embodiment of the disclosure, the BS may configure the WUS offset or WUS start offset (WUS-offset or WUS-StartOffset) 910, and the WUS cycle 920 for the UE, and configure a subframe or slot that satisfies Equation 4, Equation 4A, or Equation 4B as a location of the WUS occasion. Further, the BS may configure WUS-SlotOffset for the UE, and the WUS occasion may be located in a slot after the WUS-SlotOffset from the subframe that satisfies Equation 4, Equation 4A, or Equation 4B. The WUS-SlotOffset refers to a delay before the WUS-onDurationTimer starts. The drx-SlotOffset may be configured with, e.g., time, the number of slots, etc.

$$[(SFN \times 10) + \text{subframe number}] \text{modulo}(WUS\text{-Cycle}) = WUS\text{-Offset}(WUS\text{-StartOffset}) \quad \text{Equation 4}$$

$$[(SFN \times 10) + \text{subframe number}] \text{modulo}(WUS\text{-Cycle}) = (drx\text{-StartOffset} - WUS\text{-Offset}) \text{modulo}(WUS\text{-Cycle}) \quad \text{Equation 4A}$$

$$[(SFN \times 10) + \text{subframe number}] \text{modulo}(WUS\text{-Cycle}) = (drx\text{-StartOffset} - WUS\text{-Offset}) \text{modulo}(drx\text{-Short-Cycle}) \quad \text{Equation 4B}$$

where the WUS offset or WUS start offset (WUS-Offset or WUS-StartOffset) 910 and the WUS cycle 920 may be configured as WUS-CycleStartOffset (or WUS-CycleOffset). Furthermore, the WUS-CycleStartOffset (or WUS-CycleOffset) may be configured with, e.g., time, the number of subframes, the number of slots, etc.

In an embodiment of the disclosure, the WUS offset or WUS start offset (WUS-Offset or WUS-StartOffset) 910 may be configured based on the DRX occasion, the DRX on duration, the on duration timer activation (drx-onDurationTimer Activation), or the Active Time 605, which is a time region in which the UE is able to receive or monitor a PDCCH. For example, the WUS occasion may be configured to start before the WUS offset or WUS start offset (WUS-Offset or WUS-StartOffset) 910 from the starting point (e.g., starting symbol) of the DRX occasion, the DRX on duration, the on duration timer activation (drx-onDurationTimer Activation), or the Active Time 605. In this case, the WUS offset or WUS start offset (WUS-offset or WUS-StartOffset) 910 may also be configured with time, the number of subframes, the number of slots, etc., and may have a negative value.

In an embodiment of the disclosure, the WUS offset or WUS start offset (WUS-offset or WUS-StartOffset) 910 may be configured based on the DRX cycle. The WUS offset or WUS start offset (WUS-offset or WUS-StartOffset) 910 may satisfy the following Equation 5.

$$WUS\text{-Offset} < DRX \text{ cycle (or } drx\text{-LongCycle}) \quad \text{Equation 5}$$

As described above, the WUS occasion 810 may be located before an offset configured at least from a starting point of the DRX occasion, the DRX on duration, the on duration timer activation (drx-onDurationTimer Activation), or the Active Time 605, which is a time region for the UE to receive or monitor a PDCCH. Accordingly, when the WUS offset WUS start offset (WUS-Offset or WUS-StartOffset) 910 is configured based on the DRX cycle, the absolute value of the WUS offset or WUS start offset (WUS-Offset or WUS-StartOffset) 910 needs to be smaller than the DRX cycle (or drx-LongCycle).

Furthermore, the WUS offset or WUS start offset (WUS-offset or WUS-StartOffset) 910 may satisfy Equation 6.

$$WUS\text{-Offset (or } WUS\text{-StartOffset}) = c \cdot DRX \text{ cycle (or } drx\text{-LongCycle}) \quad \text{Equation 6}$$

$(-1 < c < 1$, where c is a rational number)

where c may be a newly configured parameter or may be created by combining the existing parameters. The WUS occasion 810 may be located before an offset configured at least from a starting point of the DRX occasion, the DRX on duration, the on duration timer activation (drx-onDurationTimer Activation), or the Active Time 605, which is a time region for the UE to receive or monitor a PDCCH. Accordingly, the WUS offset (WUS-Offset) or WUS start offset (WUS-StartOffset) 910 needs to be smaller than a positive DRX cycle (or drx-LongCycle) and greater than a negative DRX cycle (or drx-LongCycle). In this case, the WUS offset or WUS start offset (WUS-offset or WUS-StartOffset) 910 may also be configured with time, the number of subframes, the number of slots, etc., and may have a negative value.

In an embodiment of the disclosure, the WUS cycle 920 may be N times (N is an integer) the DRX cycle. For example, the WUS cycle 920 may be N times (N is a natural number) the long DRX cycle 625.

Embodiment 1-2

In the embodiment 1-2 of the disclosure, a method in which the BS indicates a WUS occasion to the UE in consideration of the DRX configuration information is provided. For example, the BS may configure the WUS offset 910 and the WUS cycle 920 for the UE by considering the DRX occasion, which is a time region in which the UE may receive or monitor a PDCCH. Furthermore, the WUS configuration information may be represented using parameters of the DRX configuration information. In an embodiment of the disclosure, the WUS may be operated by taking into account the DRX operation. The WUS cycle 920 may be configured with, e.g., time, the number of subframes, the number of slots, etc. Furthermore, the WUS offset or WUS start offset (WUS-offset or WUS-StartOffset) 910 may also be configured with time, the number of subframes, the number of slots, etc.

In an embodiment of the disclosure, the WUS cycle 920 may vary depending on the length of the DRX cycle (or drx-LongCycle). For example, the WUS cycle 920 may be differently configured according to a result of comparing a preset value or a value configured by the BS with the length of the DRX cycle (or drx-LongCycle). For example, when the preset value or the value configured by the BS is X, and the DRX cycle (or drx-LongCycle) is <X, the WUS cycle 920=N*DRX cycle (or drx-LongCycle), where N is a natural number. In this case, depending on the value of N, one WUS and a plurality of DRX occasions are mapped one to N (one-to-N mapping). Furthermore, when the preset value or the value configured by the BS is X, and the DRX cycle (or drx-LongCycle)≥X, the WUS cycle 920=DRX cycle (or drx-LongCycle). In this case, one WUS and one DRX occasion are mapped one to one (one-to-one mapping). Or, when the DRX cycle (or drx-LongCycle)≥X, the WUS cycle 920=K*DRX cycle (or drx-LongCycle), where K is a natural number. In this case, N and K may be different values, which may be separately indicated by the BS. The WUS cycle 920 and/or the DRX cycle (or drx-LongCycle) may be configured with, e.g., time, the number of subframes, the number of slots, etc.

Furthermore, in an embodiment of the disclosure, the WUS cycle 920 may be preset or defined depending on the length of the DRX cycle (or drx-LongCycle). In this case, at least one or more DRX cycle (or drx-LongCycle) lengths and at least one or more WUS cycles 920 may be mapped and stored in the form of a table. In this case, it is not necessary for the DRX cycle (or drx-LongCycle) length and the WUS cycle 920 to be mapped one to one, and one or more WUS cycles 920 may be mapped to one DRX cycle (or drx-LongCycle) length, or conversely, one WUS cycle 920 may be mapped to one or more DRX cycle (or drx-LongCycle) lengths. In an embodiment of the disclosure, once the DRX cycle (or drx-LongCycle) is set, the WUS cycle 920 is also configured according to the table. The WUS cycle 920 and/or the DRX cycle (or drx-LongCycle) may be configured with, e.g., time, the number of subframes, the number of slots, etc.

In an embodiment of the disclosure, the WUS offset (WUS-Offset) or WUS start offset (WUS-StartOffset) 910 may be configured based on the DRX occasion, the DRX on duration, the on duration timer activation (drx-onDurationTimer Activation), or the Active Time 605, which is a time region in which the UE is able to receive or monitor a PDCCH. For example, the WUS occasion may be configured to start before the WUS offset (WUS-Offset) or WUS start offset (WUS-StartOffset) 910 from the starting point (e.g., starting symbol) of the DRX occasion, the DRX on duration, the on duration timer activation (drx-onDurationTimer Activation), or the Active Time 605. In this case, the WUS offset or WUS start offset (WUS-offset or WUS-StartOffset) 910 may also be configured with time, the number of subframes, the number of slots, etc., and may have a negative value.

In an embodiment of the disclosure, the WUS offset or WUS start offset (WUS-offset or WUS-StartOffset) 910 may be configured based on the DRX cycle. The WUS offset or WUS start offset (WUS-offset or WUS-StartOffset) 910 may satisfy Equation 5.

$$WUS\text{-Offset} < DRX \text{ cycle (or } drx\text{-LongCycle)} \qquad \text{Equation 5}$$

As described above, the WUS occasion 810 may be located before an offset configured at least from a starting point of the DRX occasion, the DRX on duration, the on duration timer activation (drx-onDurationTimer Activation), or the Active Time 605, which is a time region for the UE to receive or monitor a PDCCH. Accordingly, when the WUS offset (WUS-Offset) or WUS start offset (WUS-StartOffset) 910 is configured based on the DRX cycle, the absolute value of the WUS offset (WUS-Offset) or WUS start offset (WUS-StartOffset) 910 needs to be smaller than the DRX cycle (or drx-LongCycle).

Furthermore, the WUS offset or WUS start offset (WUS-offset or WUS-StartOffset) 910 may satisfy Equation 6.

$$WUS\text{-Offset (or } WUS\text{-StartOffset)}=c*DRX \text{ cycle (or } drx\text{-LongCycle)} \qquad \text{Equation 6}$$

(−1<c<1, where c is a rational number)

where c may be a newly configured parameter or may be created by combining existing parameters. In this case, the WUS occasion 810 may be located before an offset configured at least from a starting point of the DRX occasion, the DRX on duration, the on duration timer activation (drx-onDurationTimer Activation), or the Active Time 605, which is a time region for the UE to receive or monitor a PDCCH. Accordingly, the WUS offset (WUS-Offset) or WUS start offset (WUS-StartOffset) 910 needs to be smaller than a positive DRX cycle (or drx-LongCycle) and greater than a negative DRX cycle (or drx-LongCycle). In this case, the WUS offset or WUS start offset (WUS-offset or WUS-StartOffset) 910 may also be configured with time, the number of subframes, the number of slots, etc., and may have a negative value.

In an embodiment of the disclosure, the WUS may include a BWP switching indicator that indicates switching to a particular BWP, BWP switching information, or the like. In this case, the BWP switching requires a physical time. The time required for the BWP switching may be referred to as a BWP switching delay $T_{BWP\_delay}$. Taking into account the BWP switching delay, the WUS offset or WUS start offset (WUS-offset or WUS-StartOffset) 910 may also be configured to be greater than the BWP switching delay value. For example, the WUS offset or WUS start offset (WUS-offset or WUS-StartOffset) 910 may be configured to be greater than a maximum BWP switching delay value.

As described above, in the next generation mobile communication system (5G or NR system), the BS may configure one or multiple BWPs for the UE. At least one of the configured one or more BWPs may be activated. For example, the BS may transmit in the activated BWP a WUS that indicates whether to wake up to monitor a PDCCH in a CORESET of an inactivated BWP. In this case, a hardware and/or software process may be required to activate the inactivated BWP, and the process may cause a delay. Accordingly, in an embodiment of the disclosure, taking into account the BWP switching delay, the BS may configure the WUS offset or WUS start offset (WUS-offset or WUS-StartOffset) 910 to be greater than the BWP switching delay value.

Figure 10:
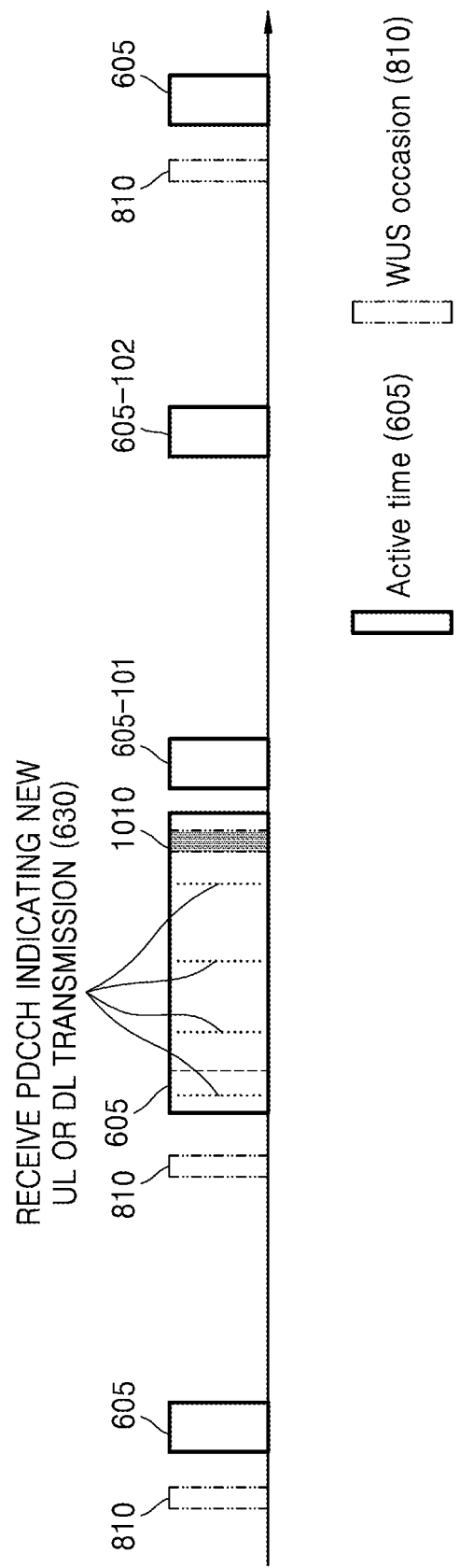
FIG. 10 is a diagram illustrating monitoring of a physical downlink control channel (PDCCH) for WUS reception when a WUS occasion is located in Active time, according to an embodiment of the disclosure.

FIG. 10 is a diagram for describing how to monitor a PDCCH for WUS reception when a WUS occasion is located in Active time, according to an embodiment of the disclosure.

Referring to FIG. 10, the UE operating in the long DRX cycle starts or restarts the drx-InactivityTimer when a certain event, e.g., reception of the PDCCH indicating new UL transmission or DL transmission 630, occurs in the Active Time 605. In this case, the UE may operate in a short DRX cycle although not shown in FIG. 10. Upon reception of the PDCCH indicating the new UL transmission or DL transmission 630, the UE may look forward to future additional UL transmission or DL transmission and extend the Active Time 605 or delay the start of InActive Time 610.

In this case, when the drx-InactivityTimer continuously restarts because the PDCCH indicating the new UL transmission or DL transmission is continuously received, the WUS occasion 1010 may happen to be located in the Active Time 605 for different reasons such as repetitive extension of the Active Time 605 or delaying in arrival of the InActive Time 610. In an embodiment of the disclosure, to reduce power consumption of the UE, the UE wakes up from the sleep or InActive state during the DRX operation and receives the WUS to determine whether there is a PDCCH to be received. However, when the WUS occasion is located in the Active Time 605, the BS needs to determine whether to transmit the WUS because the UE is already awake and in the Active state. Furthermore, the UE needs to determine whether to monitor a PDCCH to detect the DCI corresponding to the WUS.

Embodiment 2-1

In the embodiment 2-1 of the disclosure, a method of not monitoring a WUS when the WUS occasion is located in the Active Time 605 is provided.

In an embodiment of the disclosure, when a WUS occasion 1010 is located in the Active Time 605 for different reasons such as repetitive extension of the Active Time 605 or delaying of arrival of the InActive Time 610, the BS may not transmit a WUS. Furthermore, the UE may not monitor a PDCCH for detecting DCI corresponding to the WUS. The UE does not need to monitor a PDCCH to detect the DCI corresponding to the WUS because the WUS is a signal to wake up the UE that is in the sleep or InActive state but in this case, the UE is already awake.

In an embodiment of the disclosure, a particular operation may be performed on a DRX occasion related to a WUS occasion where no PDCCH is monitored. The particular operation may include an operation to assume to always wake up on the DRX occasion, or a default operation. The default operation may be pre-defined or preset by the BS. The default operation may include an operation of always waking up. For example, in FIG. 10, the UE may perform the operation assuming to always wake up on a DRX occasion 605-101 related to a WUS occasion 1010 located in the Active Time 605, or perform the default operation, e.g., an operation to wake up. Further, although the WUS occasion 1010 is shown as being related to one DRX occasion 605-101 in FIG. 10, it is not limited thereto but may be related to a plurality of DRX occasions 605-101 and 605-102. In this case, the UE may perform the operation to assume to wake up on all the plurality of DRX occasions 605-101 and 605-102, or the default operation, e.g., the operation to wake up.

Embodiment 2-2

In the embodiment 2-2 of the disclosure, a method of monitoring a WUS will be described when a WUS occasion is located in the Active Time 605.

In an embodiment of the disclosure, although a WUS occasion 1010 is located in the Active Time 605 for different reasons such as repetitive extension of the Active Time 605 or delaying of arrival of the InActive Time 610, the BS may transmit a WUS. Furthermore, the UE may monitor a PDCCH for detecting DCI corresponding to the WUS.

In an embodiment of the disclosure, in a case that the WUS occasion 1010 is located in the Active Time 605, when a result of detecting DCI corresponding to the WUS by monitoring the PDCCH does not indicate that the UE is to wake up on the DRX occasion related to the WUS, that the UE is not to wake up on the DRX occasion related to the WUS, that the UE is not to monitor the PDCCH on the DRX occasion related to the WUS or not to start the drx-onDurationTimer 615, or that the UE is to skip an associated DRX occasion, the UE may stop the Active Time 605. For example, the UE may stop the drx-onDurationTimer 615 and/or the drx-InactivityTimer 620. The UE may then enter into the sleep or InActive state.

Furthermore, in an embodiment of the disclosure, when the WUS occasion 1010 is located in the Active Time 605, the DCI corresponding to the WUS may be arranged to have the same size as in the existing DCI formats (e.g., DCI format 0_0/1_0). This will be described with reference to FIG. 11.

Figure 11:
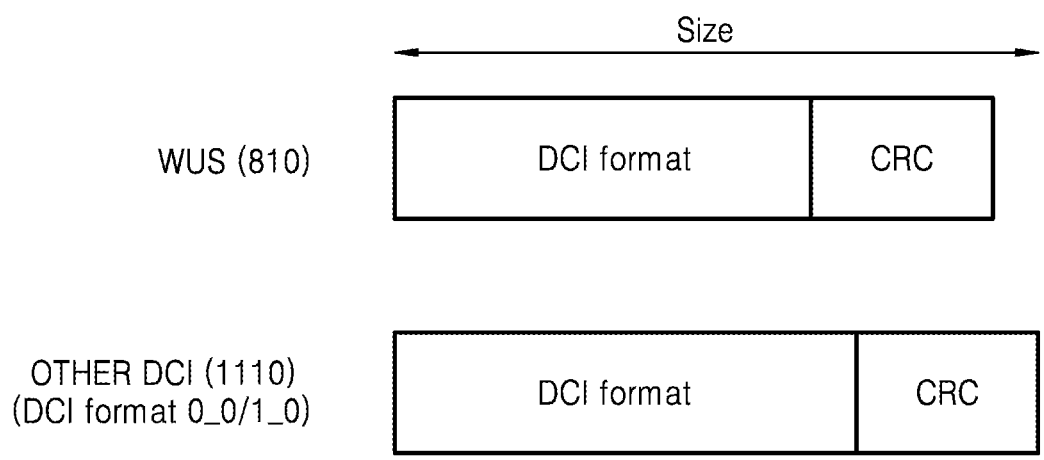
FIG. 11 is a diagram of a format and size of downlink control information (DCI) corresponding to a WUS, according to an embodiment of the disclosure.

FIG. 11 is a diagram for describing a format and size of DCI corresponding to a WUS, according to an embodiment of the disclosure.

In an embodiment of the disclosure, the DCI corresponding to the WUS may have a different size from the existing DCI formats (e.g., DCI format 0_0/1_0). The next generation mobile communication system (5G or NR system) may limit the number of pieces of DCI having different sizes monitored by the UE at a particular time to a particular number or less, to reduce complexity of DCI decoding of the UE. For example, the next generation mobile communication system (5G or NR system) may always satisfy the following two conditions:

Condition 1
the UE may monitor up to X pieces of DCI having different sizes in each slot (e.g., X=4).

Condition 2
the UE may monitor up to Y pieces of DCI having different sizes in each slot for a particular RNTI. For example, the particular RNTI may refer to a C-RNTI, a CS-RNTI, an MCS-C-RNTI, or any other UE-specific RNTI (e.g., Y=3).

The BS may appropriately adjust the DCI size to meet the conditions 1 and 2. The UE may not expect any configuration of the DCI size that does not meet the conditions 1 and 2. The size of a resource allocation field on the frequency axis of the DCI format 0_0/1_0 monitored in UE-specific search space may be determined to have the size of a currently activated BWP. However, when the size of the DCI format 0_0/1_0 monitored in UE-specific search space may be determined to have the size of a currently activated BWP, and the condition of limitation on the DCI size is not satisfied, the size of the resource allocation field on the frequency axis of the DCI format 0_0/1_0 may be determined to have the size of the initial BWP. Hence, the size of the DCI format 0_0/1_0 monitored in the common search space is equal to the size of the DCI format 0_0/1_0 monitored in the UE-specific search space, so that the number of pieces of DCI having different sizes may be reduced.

The WUS is commonly transmitted in the InActive Time 610, so that there are no other pieces of DCI 1110 transmitted alongside. Accordingly, DCI corresponding to the WUS occasion 810 transmitted in the InActive Time 610 may be configured to have the same size as in the format of the other pieces of DCI 1110, or may be configured without taking into account the other pieces of DCI 1110. However, as shown in FIG. 10, when the WUS occasion 1010 is located in the Active Time 605, the WUS is transmitted in the Active Time 605 and may be configured to have the same size as in the formats (e.g., DCI formats 0_0/1_0) of the other pieces of DCI 1110 transmitted alongside. Even when the conditions 1 and 2 are not satisfied, the WUS occasion 810 may not be arranged to have the same size as in the formats (e.g., DCI formats 0_0/1_0) of the other pieces of DCI 1110.

Alternatively, when the conditions 1 and 2 are not satisfied, the WUS occasion 810 may be arranged to have the same size as in the formats (e.g., DCI formats 0_0/1_0) of the other pieces of DCI 1110. To arrange the size of the DCI to be transmitted, zeros may be inserted (zero padding) when the DCI corresponding to the WUS occasion 810 is smaller than in the format of the other DCI 1110, and bits corresponding to some fields may be eliminated (bit truncation) when the DCI corresponding to the WUS occasion 810 is greater than in the format of the other DCI 1110.

In an embodiment of the disclosure, by arranging the size of the DCI corresponding to the WUS occasion 810, the number of times of blind decoding of the search space of the UE may be reduced, leading to power saving of the UE.

In addition, in an embodiment of the disclosure, in a case that the WUS occasion is located in the Active Time 605, when the WUS indicates that the UE is to wake up on a DRX occasion, the UE may start the drx ShortCycleTimer and operate in the short DRX cycle. The WUS indicating that the UE is to wake up in the DRX occasion means that there is data to be transmitted in the DRX occasion, so the UE may immediately operate in the short DRX cycle.

In an embodiment of the disclosure, the WUS may indicate operation of the UE on the DRX occasion related to the WUS. To indicate operation of the UE on the DRX occasion related to the WUS, a method of mapping between the WUS and the DRX occasion is required.

Embodiment 3-1

In the embodiment 3-1 of the disclosure, a method of performing one-to-one mapping between the WUS and the DRX occasion is provided.

Figure 12:
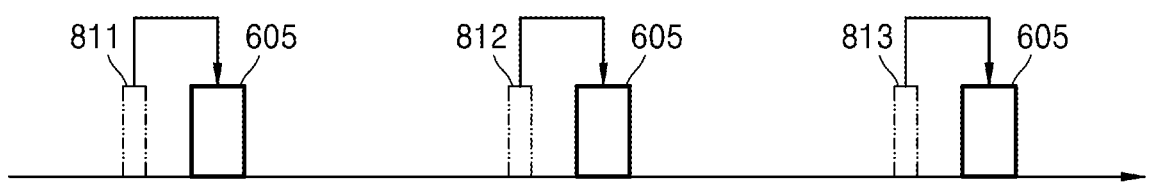
FIG. 12 is a diagram of a method of performing one-to-one mapping between the WUS and the DRX occasion, according to an embodiment of the disclosure.

FIG. 12 is a diagram for describing a method of performing one-to-one mapping between the WUS and the DRX occasion, according to an embodiment of the disclosure.

Referring to FIG. 12, in an embodiment of the disclosure, WUSs 811, 812, and 813 are mapped to the respective DRX occasions 605 one-to-one (one-to-one mapping) For example, one WUS may indicate that the UE is to wake up on a DRX occasion related to the WUS, that the UE is not to skip the DRX occasion related to the WUS, that the UE is to monitor a PDCCH on the DRX occasion related to the WUS, or that the UE is to start a drx-onDurationTimer 615 on the DRX occasion related to the WUS.

In addition, the WUS may not indicate that the UE is to wake up on the one DRX occasion related to the WUS, or may indicate that the UE is not to wake up on the one DRX occasion related to the WUS, that the UE is not to monitor the PDCCH on the one DRX occasion related to the WUS, or that the UE is not to start the drx-onDurationTimer 615 on the one DRX occasion related to the WUS, or may indicate that the UE is to skip the one DRX occasion related to the WUS.

In an embodiment of the disclosure, when the WUSs 811, 812, and 813 are mapped to the respective DRX occasions 605 one-to-one, the WUS cycle 920 may be the same as the DRX cycle (or drx-LongCycle).

Embodiment 3-2

In the embodiment 3-2 of the disclosure, a method of performing one-to-N mapping between the WUS and the DRX occasion is provided.

Figure 13:
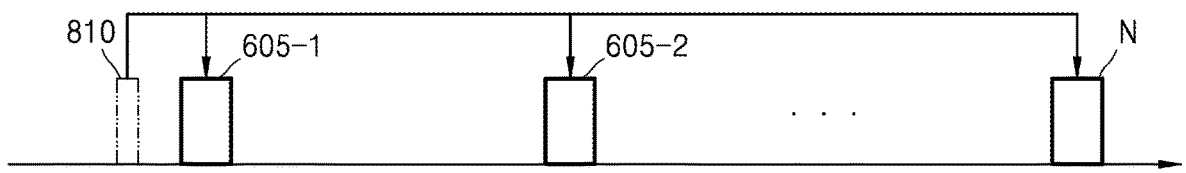
FIG. 13 is a diagram of a method of performing one-to-N mapping between the WUS and the DRX occasion, according to an embodiment of the disclosure.

FIG. 13 is a diagram for describing a method of performing one-to-N mapping between the WUS and the DRX occasion, according to an embodiment of the disclosure.

Referring to FIG. 13, in an embodiment of the disclosure, one WUS occasion 810 may be mapped to a plurality of DRX occasions 605-1, 605-2, and 605-3 (one-to-N mapping, where N is a natural number). For example, one WUS may indicate that the UE is to wake up on a plurality of DRX occasions related to the WUS, that the UE is not to skip the plurality of DRX occasions related to the WUS, that the UE is to monitor the PDCCH on the plurality of DRX occasions related to the WUS, or that the UE is to start drx-onDurationTimer 615 on the plurality of DRX occasions related to the WUS.

In addition, the WUS may not indicate that the UE is to wake up on the plurality of DRX occasions related to the WUS, or may indicate that the UE is not to wake up on the plurality of DRX occasions related to the WUS, that the UE is not to monitor the PDCCH on the plurality of DRX occasions related to the WUS, or that the UE is not to start the drx-onDurationTimer 615 on the plurality of DRX occasions related to the WUS, or may indicate that the UE is to skip the plurality of DRX occasions related to the WUS.

In an embodiment of the disclosure, when one to N mapping is performed between the one WUS occasion 810 and the plurality of DRX occasions 605, the plurality of DRX occasions 605-1, 605-2, and 605-3 may have the same indication on the plurality of DRX occasions 605-1, 605-2, and 605-3, or may have different indications on the respective DRX occasions 605-1, 605-2, and 605-3. For example, in FIG. 13, the one WUS occasion 810 may indicate that the UE is to wake up on all of the plurality of DRX occasions 605-1, 605-2, and 605-3. Furthermore, the one WUS occasion 810 may indicate that the UE is to wake up on the DRX occasion 605-1, that the UE is to skip the DRX occasion on the DRX occasion 605-2, and that the UE is to wake up on the DRX occasion 605-3.

In an embodiment of the disclosure, N is a preset value. For example, N may be a fixed value with respect to the WUS monitoring operation in the communication system, or may be a value included in the WUS configuration information provided by the BS to the UE by higher layer signaling (e.g., RRC signaling, in an MIB, or in an SIB).

Furthermore, in an embodiment of the disclosure, N may be a value indicated by the WUS. In this case, N may be indicated as a natural number or in a bitmap format. For example, when there are three DRX occasions after a WUS occasion, the BS may indicate N in a bitmap format such as '101', representing that the WUS indicates operation on the first and third DRX occasions. Alternatively, the BS may indicate N in a bitmap format such as '111', representing that the WUS indicates operation on the first, second, and third DRX occasions.

Further, in an embodiment of the disclosure, N may be implicitly indicated by the WUS occasion and the DRX occasion. For example, the UE may monitor a PDCCH on the assumption that all DRX occasions located between two neighboring WUS occasions are related to a WUS located ahead in time. That is, a WUS received on one WUS occasion may be mapped to all DRX occasions located before a next WUS occasion after the one WUS occasion. For example, a WUS located ahead in time may indicate waking up on all the DRX occasions located before the next WUS occasion and monitoring a PDCCH, indicate not waking up on all DRX occasions located between two neighboring WUS occasions, or indicate waking up on a configured DRX occasion and monitoring a PDCCH. For example, when there are 7 DRX occasions between a first WUS occasion located ahead in time and a second WUS occasion adjacent to or right next to the first WUS occasion, N=7. In this case, a WUS received on the first WUS occasion may be implicitly mapped to the 7 DRX occasions. Furthermore, the WUS received on the first WUS occasion may indicate waking up on all DRX occasions and monitoring the PDCCH for the 7 DRX occasions until the second WUS occasion, indicate not waking up on all the DRX occasions, or indicate waking up on the configured DRX occasion and monitoring the PDCCH. It is, however, just an example and not limited thereto, and N may be indicated implicitly in various methods.

In addition, in an embodiment of the disclosure, it is possible to indicate N based on a time interval between neighboring WUS occasions. For example, when the time interval between the neighboring WUS occasions is greater or smaller than a particular value, N may be configured implicitly or explicitly.

In an embodiment of the disclosure, the WUS may indicate operation of the UE on a DRX occasion related to the WUS. In this case, the WUS may indicate in 1 bit whether the UE is to wake up on all the related DRX occasions, and indicate in N bits whether the UE is to wake up on each of the related DRX occasions. Alternatively, the WUS may provide additional information e.g., information about when the UE is to wake up, along with whether the UE is to wake up, in K bits.

Embodiment 4-1

In the embodiment 4-1 of the disclosure, a method in which the WUS indicates in 1 bit whether the UE is to wake up is provided.

In an embodiment of the disclosure, the WUS may only indicate whether the UE is to wake up in 1 bit, when indicating operation of the UE on a DRX occasion related to the WUS. In an embodiment of the disclosure, overhead may be reduced by transmitting as little data as possible.

Furthermore, in an embodiment of the disclosure, indicating whether the UE is to wake up may include indicating that the UE is to wake up on a DRX occasion related to the WUS, indicating that the UE is not to skip the DRX occasion related to the WUS, indicating that the UE is to monitor the PDCCH on the DRX occasion related to the WUS, or indicating that the UE is to start drx-onDurationTimer 615 on the DRX occasion related to the WUS. Alternatively, indicating whether the UE is to wake up may include not indicating that the UE is to wake up on the DRX occasion related to the WUS, indicating that the UE is not to wake up on the DRX occasion related to the WUS, indicating that the UE is not to monitor the PDCCH on the DRX occasion related to the WUS, indicating that the UE is not to start the drx-onDurationTimer 615 on the DRX occasion related to the WUS, or indicating that the UE is to skip the DRX occasion related to the WUS.

Figure 14:
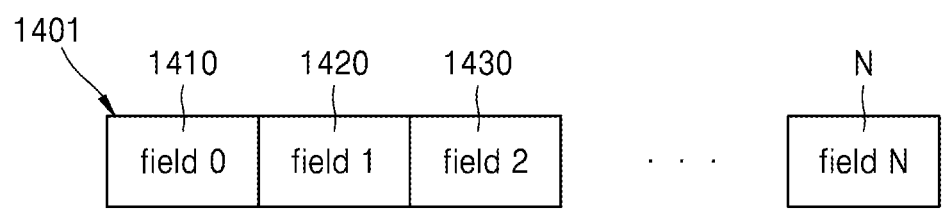
FIG. 14 is a diagram of a method of performing one-to-N mapping between the WUS and the DRX occasion with the WUS indicating in 1 bit whether a user equipment (UE) is to wake up, according to an embodiment of the disclosure.

FIG. 14 is a diagram for describing a method of performing one-to-N mapping between the WUS and the DRX occasion with the WUS indicating in 1 bit whether the UE is to wake up, according to an embodiment of the disclosure.

In an embodiment of the disclosure, when a WUS indicates in 1 bit whether the UE is to wake up and the WUS is mapped to N DRX occasions, the WUS may give this indication in the form of a bitmap 1401. Referring to FIG. 14, the bitmap may include N bits, and each field 1410, 1420, 1430, . . . , or N corresponding to each of the N bits may indicate by '0' or '1' whether the UE is to wake up on the mapped DRX occasion.

Embodiment 4-2

In the embodiment 4-2 of the disclosure, a method in which the WUS provides in K bits additional information, e.g., information about when the UE is to wake up in the Active Time 605 (i.e., time to wake up) along with whether the UE is to wake up is provided.

In an embodiment of the disclosure, the size of a field indicating the additional information, i.e., the K value, may be indicated by the BS. The BS may provide the K value to the UE by higher layer signaling (RRC signaling in an MIB, or in an SIB). Furthermore, the additional information may include information indicating what time the UE is to wake up in the Active Time 605, information indicating what time the UE is not to wake up, information relating to a change in WUS configuration (e.g., instruction to perform default operation), etc. Furthermore, in an embodiment of the disclosure, indicating whether the UE is to wake up may include indicating that the UE is to wake up on a DRX occasion related to the WUS, indicating that the UE is not to skip the DRX occasion related to the WUS, indicating that the UE is to monitor the PDCCH on the DRX occasion related to the WUS, or indicating that the UE is to start drx-onDurationTimer 615 on the DRX occasion related to the WUS. Alternatively, indicating whether the UE is to wake up may include not indicating that the UE is to wake up on the DRX occasion related to the WUS, indicating that the UE is not to wake up on the DRX occasion related to the WUS, indicating that the UE is not to monitor the PDCCH on the DRX occasion related to the WUS, indicating that the UE is not to start the drx-onDurationTimer 615 on the DRX occasion related to the WUS, or indicating that the UE is to skip the DRX occasion related to the WUS.

In the following description, for convenience of explanation, the additional information is assumed to be information about what time the UE is to wake up in the Active Time 605. It is not, however, limited thereto, and the additional information may include other various information.

Figure 15:
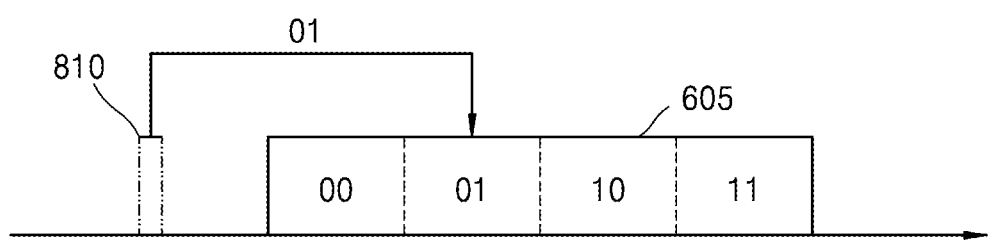
FIG. 15 is a diagram of a WUS indicating information about a time at which the UE is to wake up during Active Time, according to an embodiment of the disclosure.

In an embodiment of the disclosure, a field having K bits may include both information about whether the UE is to wake up and information about what time the UE is to wake up in the Active Time 605. Referring to FIG. 15, information about what time the UE is to wake up will be described.

FIG. 15 is a diagram for describing how a WUS indicates information about what time the UE is to wake up during Active Time, according to an embodiment of the disclosure.

Referring to FIG. 15, the Active Time 605 is divided into 4 time regions, which may be indicated in 2 bits. For example, the respective time regions may be indicated by code points 00, 01, 10, and 11. In an embodiment of the disclosure, the WUS occasion 810 may include information about a time region where the UE is to wake up along with information about whether the UE is to wake up. In FIG. 15, for example, the WUS may include a total of 3 bits, 1 bit of which indicating information about whether the UE is to wake up and 2 bits of which indicating information about a time region where the UE is to wake up. That is, K may be 3. In this case, the time region may be each of N DRX occasions mapped to a WUS occasion.

In an embodiment of the disclosure in conjunction with the description of the embodiment 4-2 of the disclosure, the information about whether the UE is to wake up and the information about what time the UE is to wake up in the Active Time 605 may be separated and included in different fields in the WUS. In this case, as in the embodiment 3-2 of the disclosure, each field may indicate operation about a plurality of DRX occasions mapped to the WUS. Furthermore, in an embodiment of the disclosure, each field may be represented in a bitmap. For example, when a WUS is mapped to 5 DRX occasions (N=5), whether the UE is to wake up in the respective DRX occasions may be indicated in a 5-bit bitmap. Furthermore, the additional information, e.g., information about what time the UE is to wake up during the Active Time 605, may also be indicated in a K-bit bitmap.

In an embodiment of the disclosure, depending on relations between values of N indicating how many DRX occasions the WUS is mapped to and K indicating a size of the additional information, interpretation of a region to which the bitmap indicates may vary. For example, when N=5 and K=3, some of K bits may indicate information about 2 DRX occasions according to Ceiling(N/K)=2, and the rest of K bits may indicate information about one DRX occasion according to Floor(N/K)=1.

In an embodiment of the disclosure, the WUS may be transmitted for one or multiple UEs. For example, the WUS may include PDCCH monitoring configuration information for one or multiple UEs. That is, the WUS may be transmitted in the unit of a plurality of UEs.

In an embodiment of the disclosure, the BS may transmit a WUS through common search space (CSS), and PDCCH monitoring configuration information for the multiple UEs may be included in the one WUS. For example, one WUS may include a scaling factor for a PDCCH monitoring cycle for each UE. Furthermore, a cell to which the PDCCH monitoring configuration information is mapped may be identified based on a bit position in the WUS.

When the WUS only indicates in 1 bit whether the UE is to wake up, overhead may be reduced, but it is hard to transmit large amounts of information. In an embodiment of the disclosure, the WUS monitoring operation may be more finely controlled by extending the size of data transmitted in the WUS to K bits and transmitting the additional information alongside.

Figure 16:
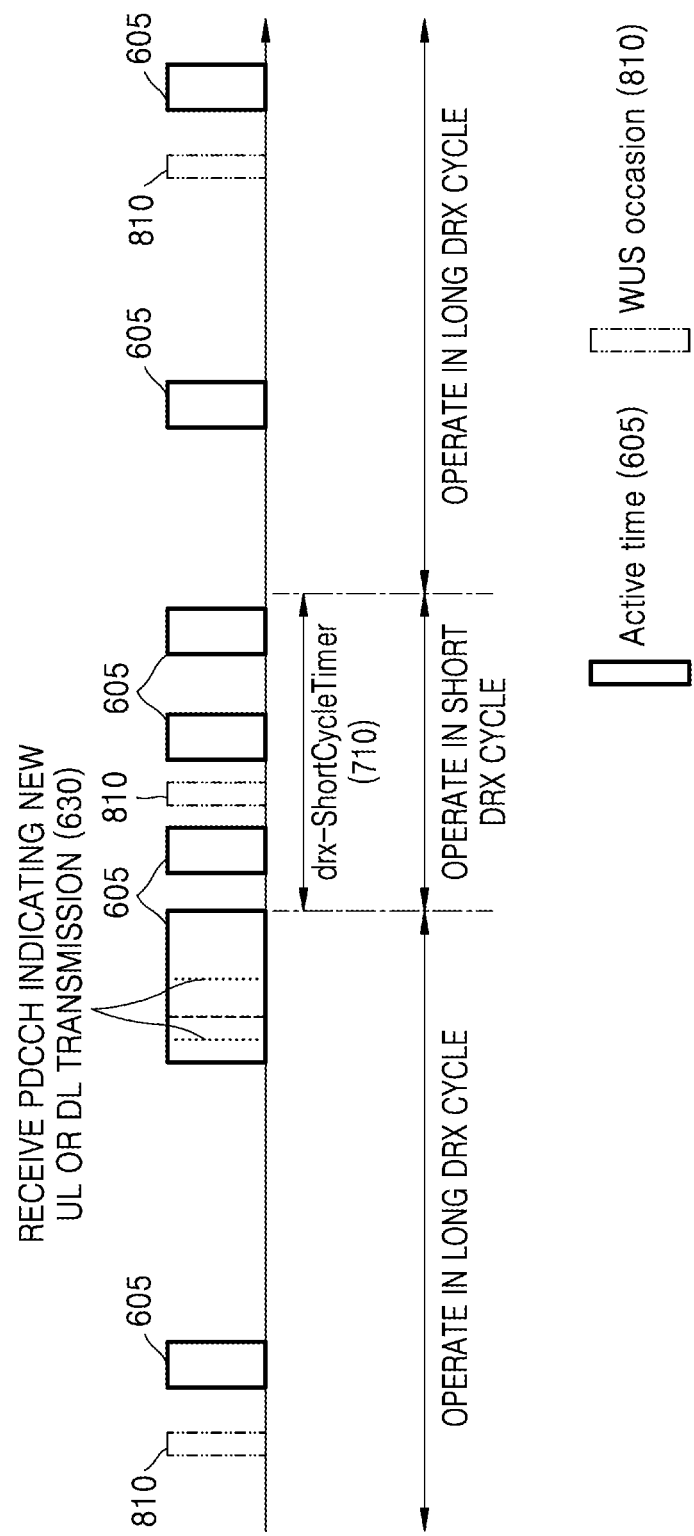
FIG. 16 is a diagram of relationships between a WUS monitoring operation and short DRX, according to an embodiment of the disclosure.

FIG. 16 is a diagram for describing relationships between WUS monitoring operation and short DRX, according to an embodiment of the disclosure.

Referring to FIG. 16, the UE operating in the long DRX cycle may operate in the short DRX cycle 705 when a certain event, e.g., reception of the PDCCH indicating new UL transmission or DL transmission 630, occurs in the Active Time 605. The short DRX cycle may be optionally applied. For example, the UE starts drx-ShortCycleTimer on expiry of the previous drx-onDurationTimer or drx-InactivityTimer, and operates in the short DRX cycle until the expiry of the drx-ShortCycleTimer. After that, when the drx-ShortCycleTimer is expired, the UE operates in the long DRX cycle again.

A relation between the short DRX cycle operation and the WUS monitoring operation needs to be determined.

Embodiment 5-1

In the embodiment 5-1 of the disclosure, in a case that both the short DRX cycle operation and the WUS monitoring operation are configured, a method of performing any one of the short DRX cycle operation or the WUS monitoring operation is provided.

In an embodiment of the disclosure, the short DRX cycle operation and the WUS monitoring operation may not be simultaneously configured for the UE. When one of the operations is configured first, the UE may not be configured with the other operation or may ignore configuration information although receiving the configuration information from the BS.

Alternatively, in an embodiment of the disclosure, when the UE is simultaneously configured with the short DRX cycle operation and the WUS monitoring operation, the UE may determine that one of the two operations is released. For example, when the UE is configured with the short DRX cycle operation and the WUS monitoring operation at the same time, the UE may perform only the short DRX cycle operation or only the WUS monitoring operation. In this case, one of the operations may be released in the order of time when the short DRX cycle operation and the WUS monitoring operation are configured. For example, the UE may perform a later configured operation after the earlier configured operation is released, or perform only the earlier configured operation as the later configured operation is released.

In an embodiment of the disclosure, the WUS monitoring operation may be performed only in relation to the Long DRX cycle but may not be performed while the short DRX cycle operation is configured. For example, while the drx-ShortCycleTimer is running, the UE may not perform the WUS monitoring operation.

Embodiment 5-2

In the embodiment 5-2 of the disclosure, in a case that both the short DRX cycle operation and the WUS monitoring operation are configured, a method of not performing the WUS monitoring operation is provided.

In an embodiment of the disclosure, when the UE operates in the short DRX cycle, the UE may not perform the WUS monitoring operation. For example, while the drx-ShortCycleTimer is running, the UE may not wake up on the WUS occasion. For example, the UE may not monitor a PDCCH for detecting DCI corresponding to the WUS on the WUS occasion. Afterwards, when the drx-ShortCycleTimer is stopped, or the drx-ShortCycleTimer is expired, the UE may resume the WUS monitoring operation. Furthermore, in an embodiment of the disclosure, when the UE operates in the long DRX cycle, the UE may resume the WUS monitoring operation. Resuming the WUS monitoring operation, which is performed by the UE, means that the UE wakes up on the WUS occasion and monitors a PDCCH to detect DCI corresponding to the WUS.

In an embodiment of the disclosure, when the UE operates in the short DRX cycle, the UE may always wake up on the DRX occasion and monitor a PDCCH. As described above, as the UE might not know whether data transmission is scheduled on a DRX occasion corresponding to the WUS occasion unless not performing the WUS monitoring operation while operating in the short DRX cycle, the UE may always wake up and monitor a PDCCH on the DRX occasion to receive data. Further, although the UE operates again in the long DRX cycle after operating in the short DRX cycle, the UE may always wake up and monitor a PDCCH on a DRX occasion corresponding to a WUS occasion on which no PDCCH is monitored so as to detect DCI corresponding to the WUS.

Embodiment 5-3

In the embodiment 5-3 of the disclosure, in a case that both the short DRX cycle operation and the WUS monitoring operation are configured, a method of performing both the short DRX cycle operation and the WUS monitoring operation is provided.

In an embodiment of the disclosure, new WUS configuration information may be used to apply the WUS monitoring operation during the short DRX cycle operation. In this case, the WUS monitoring operation performed in the long DRX cycle is referred to as long-WUS, and the WUS monitoring operation performed in the short DRX cycle is referred to as short-WUS. The long-WUS and the short-WUS may be configured to have different WUS offset and WUS cycles. In an embodiment of the disclosure, the BS may start the short on-Duration timer for the UE, similarly to the long-WUS. For example, the BS may provide short-WUS configuration information for the UE by higher layer signaling (e.g., RRC signaling, in an MIB, or in an SIB). Furthermore, for short-WUS operation, DCI corresponding to the short-WUS may have a different DCI format from DCI corresponding to the long-WUS. In this case, the DCI corresponding to the short-WUS may be scrambled by an RNTI different from that of the DCI corresponding to the long-WUS. Moreover, the DCI corresponding to the short-WUS may be transmitted in a different control resource set, i.e., a different CORESET, from the control resource set where the DCI corresponding to the long-WUS is transmitted. Furthermore, the DCI corresponding to the short-WUS may also be transmitted in different search space from the search space in which the DCI corresponding to the long-WUS is transmitted.

In an embodiment of the disclosure, the short-WUS cycle may vary depending on the length of the short DRX cycle. For example, the short-WUS cycle may be differently configured based on a result of comparing a preset value or a value configured by the BS with the drx-ShortCycleTimer value. The drx-ShortCycleTimer value may be M*drx-ShortCycle, where M is a natural number. For example, when the preset value or the value configured by the BS is X, and the drx-ShortCycleTimer value is smaller than X (<X), the short-WUS cycle=N*drx-ShortCycle, where N is a natural number. In this case, depending on the value of N, one WUS and a plurality of DRX occasions are mapped one to N (one-to-N mapping). In this case, the short-WUS cycle and/or drx-ShortCycle may be configured with, e.g., time, the number of subframes, the number of slots, etc.

In an embodiment of the disclosure, N is a preset value. For example, N may be a fixed value with respect to the short-WUS monitoring operation in the communication system, or may be a value included in the short-WUS configuration information provided by the BS to the UE by higher layer signaling (e.g., RRC signaling, in an MIB, or in an SIB).

Furthermore, in an embodiment of the disclosure, N may be a value indicated by the short-WUS. In this case, N may be indicated as a natural number or in a bitmap format. For example, when there are three DRX occasions after a short-WUS occasion, the BS may indicate N in a bitmap format such as '101', representing that the short-WUS indicates operation on the first and third DRX occasions. Alternatively, the BS may indicate N in a bitmap format such as '111', representing that the short-WUS indicates operation on the first, second, and third DRX occasions.

Further, in an embodiment of the disclosure, N may be implicitly indicated by the short-WUS occasion and the DRX occasion. For example, the UE may wake up and monitor the PDCCH on all DRX occasions located between two neighboring short-WUS occasions.

Furthermore, in an embodiment of the disclosure, when the preset value or the value configured by the BS is X, and the drx-ShortCycle≥X, the short-WUS cycle=drx-ShortCycle. In this case, one WUS and one DRX occasion are mapped one to one (one-to-one mapping). In this case, the short-WUS cycle and/or drx-ShortCycle may be configured with, e.g., time, the number of subframes, the number of slots, etc.

In an embodiment of the disclosure, the UE may apply the WUS monitoring operation intact based on the existing WUS configuration information although operating in the short DRX cycle. In this case, when the WUS indicates that the UE is to wake up on the DRX occasion or when the WUS is not received, the UE may maintain the short DRX cycle and perform the short DRX cycle operation. Furthermore, when the WUS does not indicate that the UE is to wake up on the DRX occasion, the UE may not start the on duration timer (drx-onDurationTimer) afterward. Further, the UE may stop the drx-ShortCycleTimer and then operate in the long DRX cycle. The WUS indicating that the UE is to wake up on the DRX occasion means that there is no data to be transmitted in the DRX occasion, so the UE may immediately operate in the long DRX cycle.

In an embodiment of the disclosure, the WUS cycle may refer to a WUS occasion occurrence cycle. Accordingly, the UE needs to wake up in every WUS cycle and monitor a PDCCH based on the WUS configuration information provided by the BS. In contrast, the BS does not need to always transmit the WUS in the WUS cycle. The BS may transmit the WUS only when there is information to be transmitted, or may transmit the WUS in every WUS cycle. Accordingly, how to transmit the WUS based on the WUS cycle needs to be determined.

Embodiment 6-1

In the embodiment 6-1 of the disclosure, a method in which the WUS is transmitted when the UE needs to wake up or when there is a change is provided.

In an embodiment of the disclosure, the UE needs to always wake up in the WUS cycle and monitor a PDCCH based on the WUS configuration information provided by the BS, but the BS may transmit the WUS only when there is information to be transmitted. For example, the BS may transmit the WUS only when the UE is required to wake up or there is a change. There being a change may refer to, for example, when a different operation is configured on a DRX occasion mapped to a WUS when the UE receives the WUS mapped to a plurality of DRX occasions and is operating according to indication of the received WUS. For example, it may refer to when data to be transmitted at a particular time occurs before arrival of the particular time and thus the UE needs to wake up although the WUS indicates that the UE is not to wake up on the DRX occasion at the particular time.

In an embodiment of the disclosure, when the PDCCH is monitored but no DCI corresponding to the WUS is detected at a time to receive the WUS, the UE may perform an operation according to the indication of the WUS received previously or perform a default operation. The default operation may be pre-defined or preset by the BS. The default operation may include an operation of always waking up. Furthermore, in an embodiment of the disclosure, when the UE has not received a WUS for a certain period of time or more, the UE may perform the default operation. The certain period may be pre-defined or set by the BS.

Embodiment 6-2

In the embodiment 6-2 of the disclosure, a method in which the WUS is always transmitted in the WUS cycle is provided.

In an embodiment of the disclosure, the BS may wake up and transmit a WUS to the UE in every WUS cycle. In this case, the WUS may provide a 1-bit indication of whether the UE is to wake up, and additional information, e.g., information about when the UE is to wake up, along with whether the UE is to wake up, in K bits.

In an embodiment of the disclosure, when the PDCCH is monitored but no DCI corresponding to the WUS is detected at a time to receive the WUS, i.e., in the WUS cycle, the UE may perform an operation according to the indication of the WUS received previously or perform a default operation. The default operation may be pre-defined or set by the BS. The default operation may include an operation of always waking up. Furthermore, in an embodiment of the disclosure, the UE may skip a DRX occasion related to the WUS not received.

In an embodiment of the disclosure, the WUS monitoring operation may be applied although carrier aggregation (CA) or a BWP is configured. For example, the WUS may be transmitted in each cell or each cell group and transmitted in each BWP or a particular BWP. A unit group in which the WUS is transmitted when the CA or BWP is configured will now be described.

Embodiment 7-1

In the embodiment 7-1 of the disclosure, a method of transmitting a WUS in each cell group including a plurality of cells is provided.

In an embodiment of the disclosure, the WUS may be transmitted in each cell group including the plurality of cells. For example, one WUS corresponding to the plurality of cells may be transmitted, and the UE may receive the WUS corresponding to the plurality of cells by monitoring one CORESET or search area.

Figure 17:
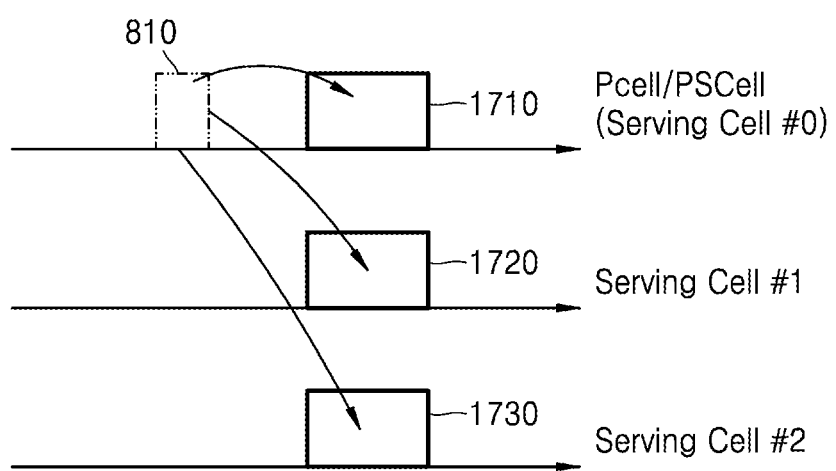
FIG. 17 is a diagram of transmitting a WUS in each cell group including a plurality of cells, according to an embodiment of the disclosure.

FIG. 17 is a diagram for describing how to transmit a WUS to each cell group including a plurality of cells, according to an embodiment of the disclosure.

For example, the WUS may be transmitted in a Primary Cell (PCell) and Primary SCell (PSCell) of the two cell groups, a Master Cell Group (MCG) and a Secondary Cell Group (SCG), respectively, and the WUS transmitted in each cell group may control the PDCCH monitoring operation of cells in the cell group.

Referring to FIG. 17, the one WUS occasion 810 may be transmitted in the PCell or PSCell (Serving Cell #0) 1710. The one WUS occasion 810 may control PDCCH monitoring configuration in the Serving Cell #0 1710, Serving Cell #1 1720, and Serving Cell #2 1730. For example, the WUS occasion 810 transmitted in the PCell or PSCell, i.e., Serving Cell #0 1710, may be used to indicate that the UE is to wake up on a DRX occasion related to the WUS occasion 810 of Serving Cell #0 1710, Serving Cell #1 1720, and Serving Cell #2 1730, that the UE is not to skip the DRX occasion related to the WUS occasion 810, that the UE is to monitor a PDCCH on the DRX occasion related to the WUS occasion 810, or that the UE is to start the drx-onDurationTimer 615 on the DRX occasion related to the WUS occasion 810. Alternatively, the WUS occasion 810 may not indicate that the UE is to wake up on the DRX occasion related to the WUS occasion 810, or may indicate that the UE is not to wake up on the DRX occasion related to the WUS occasion 810, that the UE is not to monitor the PDCCH on the DRX occasion related to the WUS occasion 810, or that the UE is not to start the drx-onDurationTimer 615 on the DRX occasion related to the WUS occasion 810, or may indicate that the UE is to skip the DRX occasion related to the WUS occasion 810.

In an embodiment of the disclosure, the one WUS occasion 810 may include a cross-carrier indicator to indicate a cell to control the PDCCH monitoring configuration. Alternatively, a cell to control the PDCCH monitoring configuration may be indicated in a cross-carrier indicator field (CIF). The PDCCH monitoring configuration in the one WUS occasion 810 may be commonly applied to all cells. In an embodiment of the disclosure, when the cross-carrier indicator or the CIF is configured, a WUS may be transmitted in a cell for controlling the PDCCH monitoring configuration of another cell, using the cross-carrier indicator or the CIF. When the P(S)Cell, i.e., Serving Cell #0 1710 controls the PDCCH monitoring configuration of Serving Cell #1 1720 using the cross-carrier indicator or the CIF, the WUS may be transmitted in the P(S)Scell, i.e., Serving Cell #0 1710.

In an embodiment of the disclosure, the one WUS occasion 810 may include both the PDCCH monitoring configuration information and the WUS configuration information for a plurality of cells. For example, the PDCCH monitoring configuration information or the WUS configuration information for a CA configured cell or a CA activated cell may be provided in the WUS occasion 810 in the format of indicating a cell index. For example, the WUS occasion 810 may include a parameter that indicates or determines indexes of cells to which to apply the PDCCH monitoring configuration information or the WUS configuration information. The PDCCH monitoring configuration information or the WUS configuration information may be applied to cells having cell indexes indicated or determined by the parameter included in the WUS occasion 810. In an embodiment of the disclosure, when the one WUS occasion 810 includes the PDCCH monitoring configuration information or the WUS configuration information for the plurality of cells, a cell to which the PDCCH monitoring configuration information or the WUS configuration information is mapped may be identified based on the bit position in the WUS occasion 810. For this, the BS may configure the UE with positions of bits to control the respective cells in the WUS occasion 810 by higher layer signaling (e.g., RRC signaling). The UE may know which cell is controlled by each bit in the received WUS occasion 810 based on the PDCCH monitoring configuration information or the WUS configuration information received from the BS, and accordingly, control the WUS based PDCCH monitoring for the plurality of cells (refer to e.g., the aforementioned WUS related function such as whether to monitor a PDCCH on the DRX occasion related to the WUS). Furthermore, the one WUS occasion 810 may include scaling factors for the PDCCH monitoring cycle in the cell index order.

Moreover, a BWP in which the one WUS is transmitted for the plurality of cells may be configured by the BS. The BS may configure a BWP in which to receive the one WUS for the plurality of cells using an identifier of the BWP.

Embodiment 7-2

In the embodiment 7-2 of the disclosure, a method of transmitting a WUS in each cell is provided.

In an embodiment of the disclosure, the WUS may be transmitted in each cell. For example, a WUS corresponding to each cell may be transmitted, and the UE may receive the WUS corresponding to the cell by monitoring a CORESET or search area corresponding to the cell.

Figure 18:
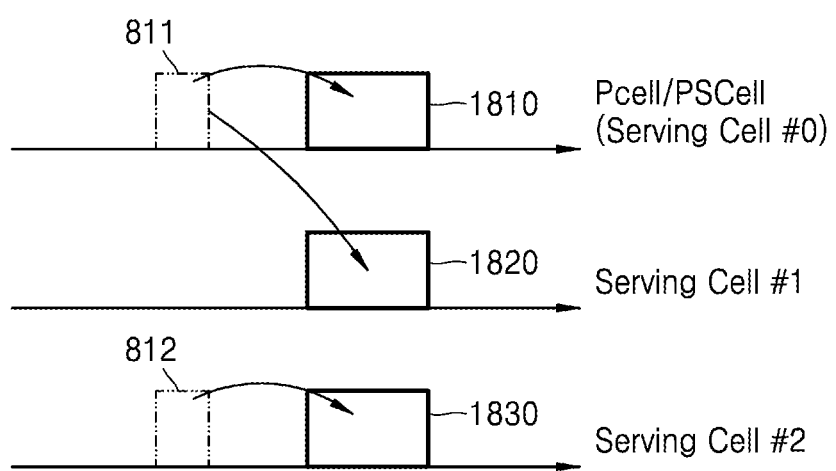
FIG. 18 is a diagram of transmitting a WUS in each cell, according to an embodiment of the disclosure.

FIG. 18 is a diagram for describing how to transmit a WUS in each cell, according to an embodiment of the disclosure;

Referring to FIG. 18, a first WUS 811 may be transmitted in a PCell or PSCell, i.e., Serving Cell #0 1810, to control the PDCCH monitoring configuration in the PCell or PSCell. A second WUS 812 may be transmitted in Serving Cell #2 1830 to control the PDCCH monitoring configuration in the Serving Cell #2 1830. For example, the WUSs 811 and 812 transmitted in the respective cells 1810 and 1830 may be used to indicate that the UE is to wake up on DRX occasions related to the WUSs 811 and 812 of the cells 1810 and 1830, that the UE is not to skip the DRX occasions related to the WUSs 811 and 812, that the UE is to monitor the PDCCH on the DRX occasions related to the WUSs 811 and 812, or that the UE is to start the drx-onDurationTimer 615 on the DRX occasions related to the WUSs 811 and 812. Alternatively, the WUSs 811 and 812 may not indicate that the UE is to wake up on the DRX occasions related to the WUSs 811 and 812, or may indicate that the UE is not to wake up on the DRX occasions related to the WUSs 811 and 812, that the UE is not to monitor the PDCCH on the DRX occasions related to the WUSs 811 and 812, or that the UE is not to start the drx-onDurationTimer 615 on the DRX occasions related to the WUSs 811 and 812, or may indicate that the UE is to skip the DRX occasions related to the WUSs 811 and 812.

When cross-carrier scheduling is configured, the BS may use the cross-carrier indicator to control PDCCH monitoring configuration of another cell. Referring to FIG. 18, when the cross-carrier scheduling is configured, the UE may control the PDCCH monitoring configuration in Serving Cell #1 1820 based on the cross-carrier indicator or the CIF and the first WUS 811 transmitted in Serving Cell #0 1810. In other words, when the cross-carrier indicator or the CIF is configured, a WUS may be transmitted in a cell for controlling the PDCCH monitoring configuration of another cell, using the cross-carrier indicator or the CIF. The WUS for controlling a cell (referred to as a second cell) configured by cross-carrier scheduling may be transmitted in a cell (referred to as a first cell) that schedules the second cell equally. For example, when the P(S)Cell, i.e., Serving Cell #0 1810, controls the PDCCH monitoring configuration of Serving Cell #1 1820 using the cross-carrier indicator or the CIF, the WUS 811 may be transmitted from the P(S)Cell, i.e., Serving Cell #0 1810.

When the cross-carrier scheduling is configured, the WUS 811 may include both the PDCCH monitoring configuration information and the WUS configuration information for the plurality of cells controlled by the WUS 811 as in the case that the one WUS 811 includes both the PDCCH monitoring configuration information and the WUS configuration information controlled by the WUS 811 as described above. For example, the PDCCH monitoring configuration information or the WUS configuration information for a plurality of cells may be provided in the WUS 811 in the format of indicating cell indexes. For example, the WUS 811 may include a parameter that indicates or determines indexes of cells to which to apply the PDCCH monitoring configuration information or the WUS configuration information. The PDCCH monitoring configuration information or the WUS configuration information may be applied to cells having cell indexes indicated or determined by the parameter included in the WUS 811. In an embodiment of the disclosure, when the one WUS 811 includes the PDCCH monitoring configuration information or the WUS configuration information for the plurality of cells, a cell to which the PDCCH monitoring configuration information or the WUS configuration information is mapped may be identified based on the bit position in the WUS 811. For this, the BS may configure the UE with positions of bits to control the respective cells in the WUS occasion 810 by higher layer signaling (e.g., RRC signaling). The UE may know which cell is controlled by each bit in the received WUS occasion 810 based on the configuration information received from the BS, and accordingly, control the WUS based PDCCH monitoring for the plurality of cells (refer to e.g., the aforementioned WUS related function such as whether to monitor the PDCCH on the DRX occasion related to the WUS). Furthermore, the one WUS 811 may include scaling factors for the PDCCH monitoring cycle in the cell index order.

When the WUS is transmitted in each cell, WUS offset in each cell may be different. For example, the BS may configure the WUS offset separately for each cell or configure additional offset for each cell. In addition, the WUS cycle in each cell may also be different.

Furthermore, a BWP in which the WUS is transmitted in each cell may be the same or different. In an embodiment of the disclosure, the BS may configure a BWP in which the WUS is transmitted, using an identifier of the BWP.

Embodiment 7-3

In the embodiment 7-3 of the disclosure, a method of transmitting the WUS in each BWP is provided.

In an embodiment of the disclosure, when a plurality of BWPs are configured, a WUS may be transmitted in an activated BWP. For example, a WUS corresponding to each BWP may be transmitted, and the UE may receive the WUS corresponding to the BWP by monitoring a CORESET or search area corresponding to the BWP.

In an embodiment of the disclosure, when a plurality of BWPs are configured, a WUS may be transmitted in a particular BWP for WUS transmission, e.g., a wake-up BWP. The wake-up BWP may be distinguished from other BWPs, and may have appropriate configuration for a wake-up PDCCH, including e.g., wake-up CORESET and wake-up search space configuration. In an embodiment of the disclosure, a BWP switching indicator or BWP switching information may serve as a trigger for the WUS monitoring operation. For example, in a case that the UE performs BWP switching based on the BWP switching indicator or BWP switching information while monitoring a BWP for which no WUS is configured, when the BWP to which switching is made is configured with a WUS, the WUS monitoring operation may be started. In an embodiment of the disclosure, when the UE is operating in a BWP in which no WUS is transmitted, the BS may transmit an explicit indication for the UE to check a WUS. Furthermore, in an embodiment of the disclosure, in a case that the UE is operating in the BWP in which no WUS is transmitted, when DRX is applied and the Inactive Time comes due to, e.g., expiry of the on-duration timer, the UE may switch to a BWP in which a WUS is transmitted.

In an embodiment of the disclosure, the one WUS occasion 810 may include PDCCH monitoring configuration information for a plurality of BWPs. For example, the PDCCH monitoring configuration information or WUS configuration information for the plurality of BWPs may be provided in the WUS occasion 810 in the format of indicating BWP indexes. For example, the WUS occasion 810 may include a parameter that indicates or determines indexes of BWPs to which to apply the PDCCH monitoring configuration information or the WUS configuration information. The PDCCH monitoring configuration information or the WUS configuration information may be applied to cells having the BWP indexes indicated or determined by the parameter included in the WUS occasion 810. In an embodiment of the disclosure, when the one WUS occasion 810 includes the PDCCH monitoring configuration information or the WUS configuration information for the plurality of cells, a BWP to which the PDCCH monitoring configuration information or the WUS configuration information is mapped may be identified based on the bit position in the WUS occasion 810. Furthermore, the one WUS occasion 810 may include scaling factors for the PDCCH monitoring cycle in the BWP index order.

The aforementioned embodiments of the disclosure may be used in combination.

Figure 19:
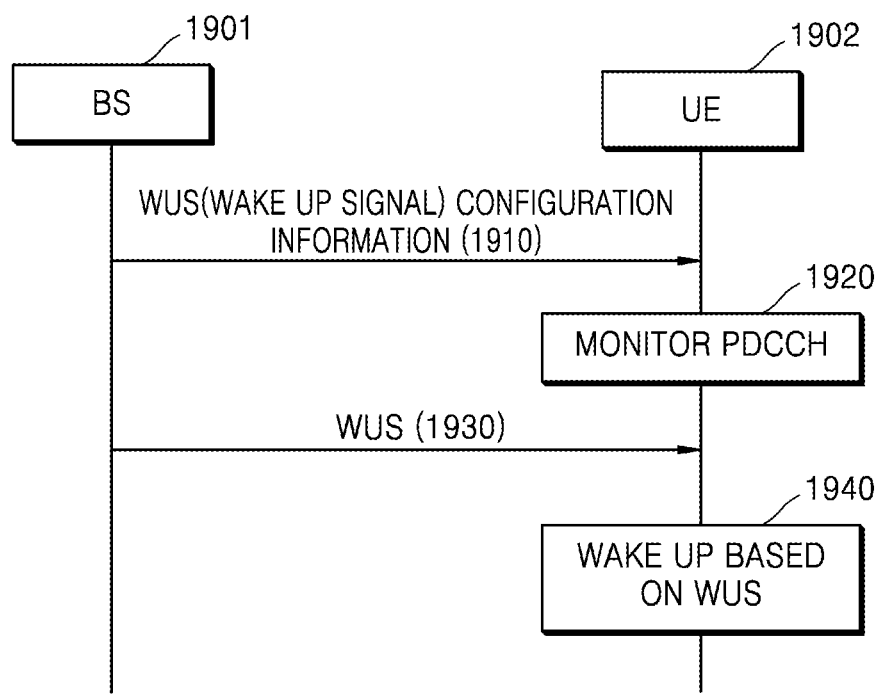
FIG. 19 is a sequence chart illustrating a method of saving power of the UE in a wireless communication system, according to an embodiment of the disclosure.

FIG. 19 is a sequence chart illustrating a method of saving power of the UE in a mobile communication system, according to an embodiment of the disclosure.

Referring to FIG. 19, in operation 1910, a BS 1901 transmits WUS configuration information to a UE 1902. The BS 1901 may configure a WUS monitoring operation for the UE by transmitting the WUS configuration information. In an embodiment of the disclosure, the BS 1901 may provide the WUS configuration information for the UE 1902 by higher layer signaling (e.g., RRC signaling, in an MIB, or in an SIB). In an embodiment of the disclosure, the WUS configuration information may include WUS offset or WUS start offset and a WUS cycle.

In an embodiment of the disclosure, the BS 1901 may configure a WUS monitoring operation for the UE 1902 independently regardless of the DRX operation, or by taking into account DRX configuration information.

In operation 1920, the UE 1902 may monitor a PDCCH based on the WUS configuration information. For example, the UE 1902 may monitor a PDCCH on a WUS occasion, which is a particular time region in which to receive a WUS based on the WUS configuration information.

In an embodiment of the disclosure, when the WUS occasion is located in the Active Time, the UE 1902 may not monitor a WUS, but may perform a particular operation on a DRX occasion related to a WUS occasion in which no PDCCH is monitored. Alternatively, when the WUS occasion is located in the Active Time, the UE 1902 may monitor a WUS, and when the WUS indicates that the UE 1902 is not to wake up on a DRX occasion related to the WUS, the UE 1902 may stop the Active Time 605. When the WUS indicates that the UE 1902 is to wake up on the DRX occasion related to the WUS, the DCI corresponding to the WUS may be arranged to have the same size as in the existing DCI formats (e.g., DCI format 0_0/1_0).

In operation 1930, the UE 1902 may receive a WUS from the BS 1901 on a downlink control channel, PDCCH. For example, the UE 1902 may receive a WUS when the WUS is transmitted while monitoring the downlink control channel, PDCCH, based on the WUS configuration information.

In an embodiment of the disclosure, the WUS and the DRX occasion may be mapped one-to-one or one-to-N. N may be preset, may be a value indicated by a WUS, or may be implicitly set.

In an embodiment of the disclosure, the WUS may indicate in 1 bit whether the UE is to wake up, or provide additional information, e.g., information about when the UE is to wake up in the Active Time 605 (i.e., time to wake up) along with whether the UE is to wake up in K bits.

In an embodiment of the disclosure, the UE 1902 needs to wake up in every WUS cycle and monitor a PDCCH based on the WUS configuration information provided by the BS. In contrast, the BS 1901 does not always need to transmit the WUS in the WUS cycle. In an embodiment of the disclosure, when the WUS is transmitted only when there is information to be transmitted, but no DCI corresponding to the WUS is detected at a time to receive the WUS although a PDCCH is monitored, the UE 1902 may operate according to indication of the WUS received previously or perform a default operation. Furthermore, when the UE 1902 has not received the WUS for a certain period of time or more, the UE may perform the default operation. In an embodiment of the disclosure, when the WUS is transmitted in every WUS cycle, the UE 1902 may operate according to indication of the WUS previously received, or perform the default operation. Furthermore, in an embodiment of the disclosure, the UE 1902 may skip a DRX occasion related to the WUS not received.

In operation 1940, the UE 1902 may wake up on a DRX occasion related to the WUS based on the WUS.

In an embodiment of the disclosure, when both the short DRX cycle operation and the WUS monitoring operation are configured, one of the short DRX cycle operation and the WUS monitoring operation may be performed; when both the short DRX cycle operation and the WUS monitoring operation are configured, the WUS monitoring operation may not be performed; when both the short DRX cycle operation and the WUS monitoring operation are configured, both the short DRX cycle operation and the WUS monitoring operation may be performed.

In an embodiment of the disclosure, the WUS monitoring operation may be applied although CA or a BWP is configured. In an embodiment of the disclosure, a WUS may be transmitted for every cell group including a plurality of cells, for each cell, or in each BWP.

Figure 20:
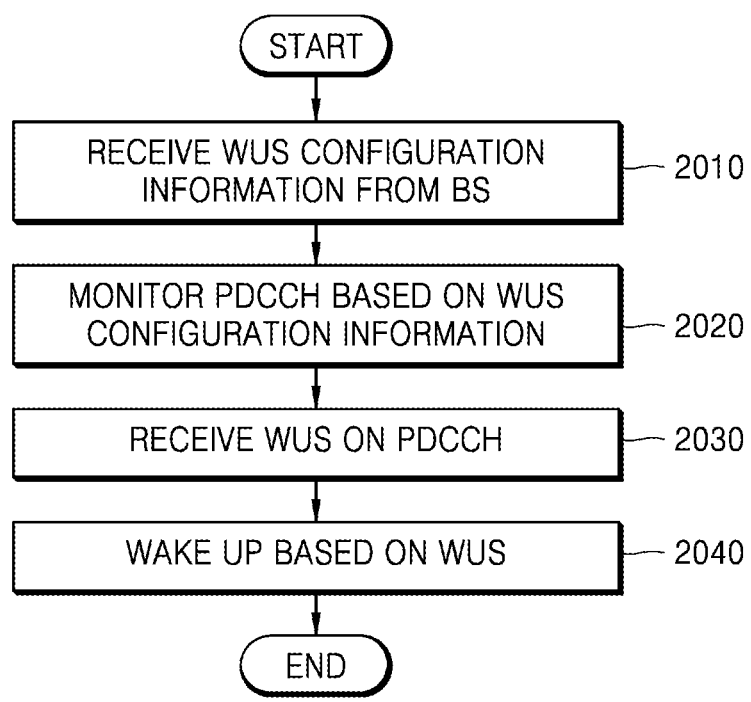
FIG. 20 is a flowchart illustrating operation of a UE to perform a method of saving power of the UE in a wireless communication system, according to an embodiment of the disclosure.

FIG. 20 is a flowchart illustrating operation of a UE to perform a method of saving power of the UE in a wireless communication system, according to an embodiment of the disclosure;

Referring to FIG. 20, in operation 2010, a BS transmits WUS configuration information to a UE. In an embodiment of the disclosure, the UE may receive the WUS configuration information from the BS by higher layer signaling (e.g., RRC signaling, in an MIB, or in an SIB). In an embodiment of the disclosure, the WUS configuration information may include WUS offset or WUS start offset and a WUS cycle.

In operation 2020, the UE may monitor a DL control channel (PDCCH) based on the WUS configuration information. For example, the UE may monitor the DL control channel (PDCCH) on a WUS occasion, which is a particular time region in which to receive a WUS based on the WUS configuration information.

In an embodiment of the disclosure, when the WUS occasion is located in the Active Time, the UE may not monitor a WUS, but may perform a particular operation on a DRX occasion related to a WUS occasion on which no PDCCH is monitored. Alternatively, when the WUS occasion is located in the Active Time, the UE may monitor a WUS, and when the WUS indicates that the UE is not to wake up on a DRX occasion related to the WUS, the UE may stop the Active Time. When the WUS indicates that the UE is to wake up on the DRX occasion related to the WUS, the DCI corresponding to the WUS may be arranged to have the same size as in the existing DCI formats (e.g., DCI format 0_0/1_0).

In operation 2030, the UE receives a WUS from the BS on a DL control channel. For example, the UE 1902 may receive a WUS when the WUS is transmitted while monitoring the DL control channel, PDCCH, based on the WUS configuration information in operation 2020.

In an embodiment of the disclosure, the WUS and the DRX occasion may be mapped one-to-one or one-to-N. N may be preset, may be a value indicated by a WUS, or may be implicitly set.

In an embodiment of the disclosure, the WUS may indicate in 1 bit whether the UE is to wake up, or provide additional information, e.g., information about when the UE is to wake up in the Active Time (i.e., time to wake up) along with whether the UE is to wake up in K bits.

In an embodiment of the disclosure, when the WUS is transmitted only when there is information to be transmitted, but no DCI corresponding to the WUS is detected at a time to receive the WUS although a PDCCH is monitored, the UE may operate according to indication of the WUS received previously or perform a default operation. Furthermore, when the UE has not received a WUS for a certain period of time or more, the UE may perform the default operation. In an embodiment of the disclosure, when the WUS is transmitted in every WUS cycle, the UE may operate according to indication of the WUS previously received, or perform the default operation. Furthermore, in an embodiment of the disclosure, the UE may skip a DRX occasion related to the WUS not received.

In operation 2040, the UE may wake up on a DRX occasion related to the WUS based on the WUS.

In an embodiment of the disclosure, when both the short DRX cycle operation and the WUS monitoring operation are configured, one of the short DRX cycle operation and the WUS monitoring operation may be performed. When both the short DRX cycle operation and the WUS monitoring operation are configured, the WUS monitoring operation may not be performed. When both the short DRX cycle operation and the WUS monitoring operation are configured, both the short DRX cycle operation and the WUS monitoring operation may be performed.

In an embodiment of the disclosure, the WUS monitoring operation may be applied although CA or a BWP is configured. In an embodiment of the disclosure, a WUS may be transmitted for every cell group including a plurality of cells, for each cell, or in each BWP.

Figure 21:
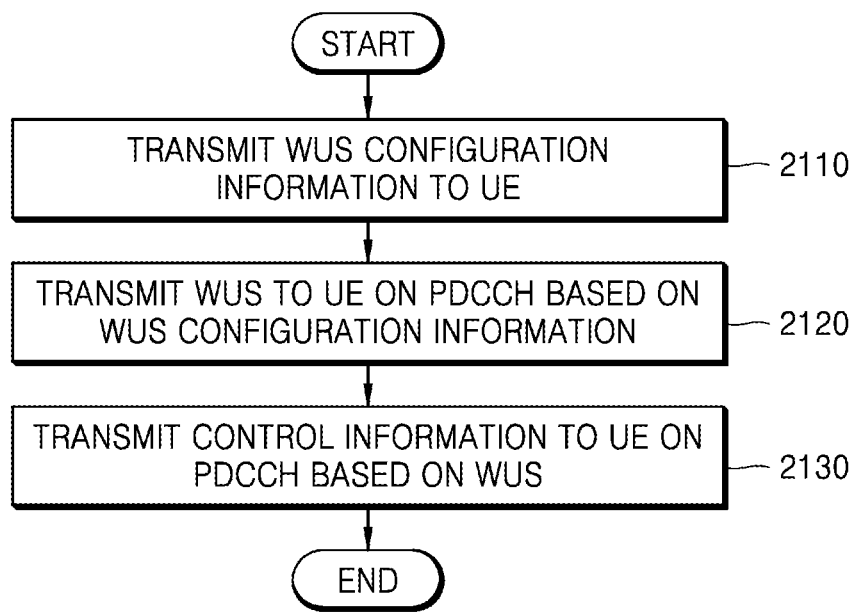
FIG. 21 is a flowchart illustrating operation of a UE to perform a method of saving power of the UE in a wireless communication system, according to an embodiment of the disclosure.

FIG. 21 is a flowchart illustrating operation of a BS to perform a method of saving power of the UE in a wireless communication system, according to an embodiment of the disclosure.

Referring to FIG. 21, in operation 2110, a BS transmits WUS configuration information to a UE. The BS may configure a WUS monitoring operation for the UE by transmitting the WUS configuration information. In an embodiment of the disclosure, the BS may provide the WUS configuration information for the UE by higher layer signaling (e.g., RRC signaling, in an MIB, or an SIB). In an embodiment of the disclosure, the WUS configuration information may include WUS offset or WUS start offset and a WUS cycle.

In an embodiment of the disclosure, the BS may configure a WUS monitoring operation for the UE independently regardless of the DRX operation, or by taking into account DRX configuration information.

In operation 2120, the BS transmits a WUS to the UE on a DL control channel (PDCCH).

In an embodiment of the disclosure, when the WUS occasion is located in the Active Time, and the WUS indicates that the UE is to wake up on the DRX occasion related to the WUS, the BS may arrange the DCI corresponding to the WUS to have the same size as in the existing DCI formats (e.g., DCI format 0_0/1_0).

In an embodiment of the disclosure, the WUS and the DRX occasion may be mapped one-to-one or one-to-N. N may be preset, may be a value indicated by a WUS, or may be implicitly set.

In an embodiment of the disclosure, the WUS may indicate in 1 bit whether the UE is to wake up, or provide additional information, e.g., information about when the UE is to wake up in the Active Time (i.e., time to wake up) along with whether the UE is to wake up in K bits.

In operation 2130, the BS transmits control information to the UE on a DL control channel based on the WUS.

In an embodiment of the disclosure, when both the short DRX cycle operation and the WUS monitoring operation are configured, one of the short DRX cycle operation and the WUS monitoring operation may be performed; when both the short DRX cycle operation and the WUS monitoring operation are configured, the WUS monitoring operation may not be performed; when both the short DRX cycle operation and the WUS monitoring operation are configured, both the short DRX cycle operation and the WUS monitoring operation may be performed.

In an embodiment of the disclosure, the WUS monitoring operation may be applied although CA or a BWP is configured. In an embodiment of the disclosure, a WUS may be transmitted for every cell group including a plurality of cells, for each cell, or in each BWP.

Figure 22:
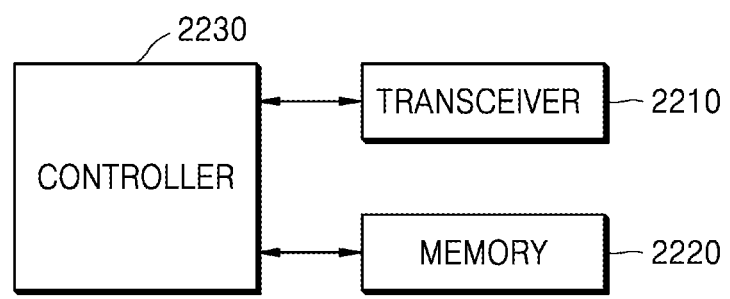
FIG. 22 is a block diagram illustrating the structure of a UE, according to an embodiment of the disclosure.
Figure 23:
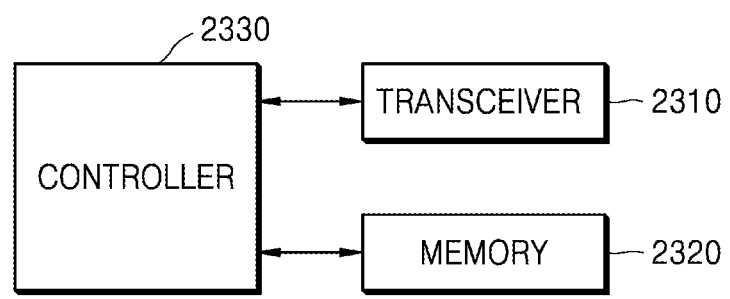
FIG. 23 is a block diagram illustrating the structure of a BS, according to an embodiment of the disclosure.

Transceivers, memories, and processors of the UE and the BS to implement the embodiments of the disclosure are shown in FIGS. 22 and 23. The embodiments of the disclosure provide a POSS transmission and reception method, a PDCCH monitoring control method, and a transmission and reception method of the BS and the UE to which data transmission and reception operations according to the methods are applied. To perform the methods, transceivers, memories, and processors of the UE and the BS may be operated according to the aforementioned embodiments of the disclosure.

FIG. 22 is a block diagram illustrating the structure of a UE, according to an embodiment of the disclosure.

Referring to FIG. 22, a UE may include a transceiver 2210, a memory 2220, and a processor 2230. Components of the UE are not, however, limited thereto. For example, the UE may include more or fewer elements than described above. In addition, at least some or all of the transceiver 2210, the memory 2220, and the processor 2230 may be implemented in a single chip.

In an embodiment of the disclosure, the transceiver 2210 may transmit or receive signals to or from a BS. The aforementioned signals may include control information and data. For this, the transceiver 2210 may include an RF transmitter for up-converting the frequency of a signal to be transmitted and amplifying the signal and an RF receiver for low-noise amplifying a received signal and down-converting the frequency of the received signal. In addition, the transceiver 2210 may receive a signal on a wireless channel and output the signal to the processor 2230, or transmit a signal output from the processor 2230 on a wireless channel.

In an embodiment of the disclosure, the memory 2220 may store a program and data required for operation of the UE. Furthermore, the memory 2220 may store control information or data included in a signal transmitted or received by the UE. The memory 2220 may include a storage medium such as a read only memory (ROM), a random access memory (RAM), a hard disk, a compact disc (CD) ROM, and a digital versatile disc (DVD), or a combination of storage mediums. Moreover, the memory 2220 may be in the plural. In an embodiment of the disclosure, the memory 2220 may store a program to execute an operation for saving power of the UE.

In an embodiment of the disclosure, the processor 2230 may control a series of processes for the UE to be operated according to the above embodiments of the disclosure. In an embodiment of the disclosure, the processor 2230 may execute the program stored in the memory 2220 to control the UE to receive WUS configuration information from the BS, monitor a DL control channel (PDCCH) based on the WUS configuration information, receive a WUS from the BS on the DL control channel, and wake up.

FIG. 23 is a block diagram illustrating the structure of a BS, according to an embodiment of the disclosure.

Referring to FIG. 23, a BS may include a transceiver 2310, a memory 2320, and a processor 2330. Components of the BS are not, however, limited thereto. For example, the BS may include more or fewer elements than described above. In addition, the transceiver 2310, the memory 2320, and the processor 2330 may be implemented in a single chip.

In an embodiment of the disclosure, the transceiver 2310 may transmit or receive signals to or from a UE. The aforementioned signals may include control information and data. For this, the transceiver 2310 may include an RF transmitter for up-converting the frequency of a signal to be transmitted and amplifying the signal and an RF receiver for low-noise amplifying a received signal and down-converting the frequency of the received signal. In addition, the transceiver 2310 may receive a signal on a wireless channel and output the signal to the processor 2330, or transmit a signal output from the processor 2330 on a wireless channel.

In an embodiment of the disclosure, the memory 2320 may store a program and data required for operation of the BS. Furthermore, the memory 2320 may store control information or data included in a signal transmitted or received by the BS. The memory 2320 may include a storage medium such as a ROM, a RAM, a hard disk, a CD-ROM, and a DVD, or a combination of storage mediums. Moreover, the memory 2320 may be in the plural. In an embodiment of the disclosure, the memory 2320 may store a program to execute an operation for saving power of the UE.

In an embodiment of the disclosure, the processor 2330 may control a series of processes for the BS to be operated according to the above embodiments of the disclosure. In an embodiment of the disclosure, the processor 2330 may execute the program stored in the memory 2320 to control the BS to transmit WUS configuration information to the UE, transmit a WUS to the UE on a DL control channel based on the WUS configuration information, and transmit control information to the UE on the DL control channel based on the WUS.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

Embodiments of the disclosure may provide a communication method and apparatus for effectively saving power of the UE in a mobile communication system.

While the disclosure has been shown and described with reference to various embodiments thereof, it will be understood by those skilled in the art that various changes in form and details may be made therein without departing from the spirit and scope of the disclosure as defined by the appended claims and their equivalents. Thus, it will be apparent to those of ordinary skill in the art that the disclosure is not limited to the embodiments of the disclosure, which have been provided only for illustrative purposes. Furthermore, the embodiments may be operated by being combined with one another when necessary. For example, an embodiment of the disclosure and some of another embodiment of the disclosure may be combined to operate the BS and the UE. The embodiments of the disclosure may be equally applied to other communication systems, and other modifications of the embodiments may also be made without departing from the scope of the disclosure. For example, the embodiments of the disclosure may also be applied to an LTE system, 5G or NR system, etc.

What is claimed is:

1. A method performed by a user equipment (UE) in a wireless communication system, the method comprising:
in case that a long discontinuous reception (DRX) cycle is used and a subframe where the long DRX cycle starts is determined, identifying configuration information for monitoring power saving information;
identifying power saving information occasion associated with the long DRX cycle based on the configuration information, wherein the power saving information occasion occurs prior to the subframe; and
in case that the power saving information occasion occurs in an active time, skipping the monitoring of the power saving information during the active time and starting a drx-onDurationTimer after an offset from a beginning of the subframe.

2. The method of claim 1, further comprising in case that the power saving information occasion occurs outside the active time, monitoring a physical downlink control channel (PDCCH) for detection of the power saving information during the power saving information occasion.

3. The method of claim 2, further comprising in case that the power saving information is detected and indicates to start the drx-onDurationTimer, starting the drx-onDurationTimer after the offset from the beginning of the subframe.

4. The method of claim 2, further comprising in case that the power saving information is not detected, starting the drx-onDurationTimer after the offset from the beginning of the subframe, based on the configuration information.

5. The method of claim 1, wherein the power saving information is configured on a primary cell (PCell) or primary secondary cell (PSCell).

6. The method of claim 1, wherein the configuration information comprises offset information for the power saving information.

7. The method of claim 1, further comprising monitoring a PDCCH based on the drx-onDurationTimer.

8. The method of claim 1, further comprising monitoring a PDCCH, in case that a short DRX cycle is used.

9. The method of claim 8, wherein the monitoring of the power saving information is skipped, in case that the short DRX cycle is used.

10. The method of claim 9, further comprising: resuming monitoring of the power saving information, when a drx-ShortCycleTimer stops or expires.

11. A user equipment (UE) in a wireless communication system, the UE comprising:
a transceiver; and
at least one processor configured to:
in case that a long discontinuous reception (DRX) cycle is used and a subframe where the long DRX cycle starts is determined, identify configuration information for monitoring power saving information,
identify power saving information occasion associated with the long DRX cycle based on the configuration information, wherein the power saving information occasion occurs prior to the subframe, and
in case that the power saving information occasion occurs in an active time, skip the monitoring of the power saving information during the active time and start a drx-onDurationTimer after an offset from a beginning of the subframe.

12. The UE of claim 11, wherein the at least one processor is further configured to in case that the power saving information occasion occurs outside the active time, monitor, via the transceiver, a physical downlink control channel (PDCCH) for detection of the power saving information during the power saving information occasion.

13. The UE of claim 12, wherein the at least one processor is further configured to in case that the power saving information is detected and indicates to start the drx-onDurationTimer, start the drx-onDurationTimer after the offset from the beginning of the subframe.

14. The UE of claim 12, wherein the at least one processor is further configured to in case that the power saving information is not detected, start the drx-onDurationTimer after the offset from the beginning of the subframe, based on the configuration information.

15. The UE of claim 11, wherein the power saving information is configured on a primary cell (PCell) or primary secondary cell (PSCell).

16. The UE of claim 11, wherein the configuration information comprises offset information for the power saving information.

17. The UE of claim 11, wherein the at least one processor is further configured to monitor, via the transceiver, a PDCCH based on the drx-onDurationTimer.

18. The UE of claim 11, wherein the at least one processor is further configured to monitor, via the transceiver, a PDCCH in case that a short DRX cycle is used.

19. The UE of claim 18, wherein the monitoring of the power saving information is skipped, in case that the short DRX cycle is used.

20. The UE of claim 19, wherein the at least one processor is further configured to resume monitoring of the power saving information, when a drx-ShortCycleTimer stops or expires.

* * * * *